United States Patent
Baek et al.

(10) Patent No.: US 10,448,353 B2
(45) Date of Patent: Oct. 15, 2019

(54) METHOD FOR MANAGING REGISTRATION AND SESSION IN WIRELESS COMMUNICATION SYSTEM AND APPARATUS FOR PERFORMING THE SAME

(71) Applicant: Samsung Electronics Co., Ltd., Suwon-si, Gyeonggi-do (KR)

(72) Inventors: Youngkyo Baek, Seoul (KR); Sunghoon Kim, Seoul (KR); Jungje Son, Yongin-si (KR); Hoyeon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/923,383

(22) Filed: Mar. 16, 2018

(65) Prior Publication Data

US 2018/0270781 A1    Sep. 20, 2018

(30) Foreign Application Priority Data

Mar. 16, 2017  (KR) .................. 10-2017-0033343

(51) Int. Cl.
*H04W 4/00*     (2018.01)
*H04W 60/06*    (2009.01)
(Continued)

(52) U.S. Cl.
CPC .......... *H04W 60/06* (2013.01); *H04W 60/005* (2013.01); *H04W 88/02* (2013.01)

(58) Field of Classification Search
CPC ... H04W 60/00; H04W 60/005; H04W 60/02; H04W 60/04; H04W 60/06
(Continued)

(56) References Cited

U.S. PATENT DOCUMENTS

| 2012/0008551 A1 | 1/2012 | Giaretta et al. |
| 2013/0150041 A1* | 6/2013 | Shaheen ........... H04W 36/0016 455/436 |

(Continued)

FOREIGN PATENT DOCUMENTS

| KR | 10-2015-0055535 A | 5/2015 |
| KR | 10-2015-0103201 A | 9/2015 |
| KR | 10-2016-0140262 A | 12/2016 |

OTHER PUBLICATIONS

LG Electronics; TS 23.501: Registration and Connection Management—non-3GPP aspects; SA WG2 Meeting #119; S2-170840; Feb. 13-17, 2017; Dubrovnik, Croatia.

*Primary Examiner* — Huy C Ho
(74) *Attorney, Agent, or Firm* — Jefferson IP Law, LLP

(57) ABSTRACT

A communication technique that combines a 5G communication system for supporting a data rate that is higher than that of a beyond 4G system with IoT technology, and a system thereof are provided. The technique may be applied to intelligent services on the basis of 5G communication technology and IoT related technology, such as smart home, smart building, smart city, smart car or connected car, health care, digital education, retail, etc. A method of performing access deregistration by a user equipment (UE) and an apparatus therefor are provided. The method includes, when the UE is registered on both 3rd generation partnership project (3GPP) access and non-3GPP access, transmitting, to an access and mobility management function (AMF), a deregistration request message to deregister the non-3GPP access over the 3GPP access, and receiving, from the AMF, a deregistration accept message corresponding to the deregistration request message over the 3GPP access.

20 Claims, 19 Drawing Sheets

(51) Int. Cl.
*H04W 88/02* (2009.01)
*H04W 60/00* (2009.01)

(58) Field of Classification Search
USPC .................................................. 455/435.1
See application file for complete search history.

(56) References Cited

U.S. PATENT DOCUMENTS

| | | |
|---|---|---|
| 2015/0131578 A1 | 5/2015 | Baek et al. |
| 2015/0208235 A1 | 7/2015 | Ingale et al. |
| 2018/0167915 A1 | 6/2018 | Lee et al. |

* cited by examiner

METHOD FOR MANAGING REGISTRATION AND SESSION IN WIRELESS COMMUNICATION SYSTEM AND APPARATUS FOR PERFORMING THE SAME

CROSS-REFERENCE TO RELATED APPLICATION(S)

This application is based on and claims priority under 35 U.S.C. § 119 to Korean Patent Application No. 10-2017-0033343, filed on Mar. 16, 2017 in the Korean Intellectual Property Office, the disclosure of which is incorporated by reference herein in its entirety.

TECHNICAL FIELD

The disclosure relates to a method for processing a registration request message for registering on a 5G network by a terminal in accordance with an access management function (AMF) issuing a temporary user identity (ID) when registering on the 5G network using the temporary user ID.

Further, the disclosure relates to a method for processing a PDU session establishment request by a terminal in consideration of whether to support a PDU session type of a session management function (SMF) in a process of making a PDU session for servicing traffics in a mobile communication system.

Further, the disclosure relates to a method for effectively managing registration and session management by a terminal when a coverage loss for a non-3GPP access occurs in a situation where the terminal accesses a 5G network through a 3GPP access and a non-3GPP access.

BACKGROUND

In order to meet the demand for wireless data traffic that is on an increasing trend after commercialization of 4G communication systems, efforts have been made to develop improved 5G or pre-5G communication system. For this reason, the 5G or pre-5G communication system is also called a beyond 4G network communication system or a post LTE system.

In order to achieve high data rate, implementation of a 5G communication system in an ultrahigh frequency (mmWave) band (e.g., like 60 GHz band) has been considered. In order to mitigate a path loss of radio waves and to increase a transfer distance of the radio waves in the ultrahigh frequency band, technologies of beamforming, massive MIMO, full dimension MIMO (FD-MIMO), array antennas, analog beamforming, and large-scale antennas for the 5G communication system have been discussed.

Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation.

In addition, in the 5G system, hybrid FSK and QAM modulation (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

On the other hand, the Internet, which is a human centered connectivity network where humans generate and consume information, is now evolving to the Internet of things (IoT) where distributed entities, such as things, exchange and process information. The Internet of everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, a sensor network for machine-to-machine connection, machine-to-machine (M2M) communication, machine type communication (MTC), and so forth have been recently researched. Such an IoT environment may provide intelligent Internet technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing information technology (IT) and various industries.

Accordingly, various attempts have been made to apply the 5G communication system to IoT networks. For example, technologies of sensor network, machine to machine (M2M) communication, and MTC have been implemented by techniques for beam-forming, MIMO, and array antennas, which correspond to the 5G communication technology. As the big data processing technology as described above, application of a cloud radio access network (cloud RAN) would be an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method, for a terminal that can effectively proceed with a registration process using a UE context for the previous access through a temporary user ID and a context of a terminal currently accessing through another access when registering on a 5G network using the temporary user ID. However, it is necessary that the operation of an AMF differs depending on whether the context indicated by the temporary user ID is the UE context for the previous access or the context of the terminal currently accessing through another access, and an aspect of the disclosure provides a method by a terminal for processing a registration request message for registering on the 5G network in accordance with the state of the temporary user ID.

In accordance with another aspect of the disclosure, in a mobile communication system, a terminal sends to an AMF a PDU session establishment request to make a PDU session for servicing traffics, and the AMF generates the PDU session by processing the PDU session establishment request message through selection of an SMF.

Another aspect of the disclosure is to provide a method for resuming an SMF selection so that the SMF supporting the PDU session type requested by the terminal can process the PDU session establishment request if the SMF does not support the PDU session type requested by the terminal, for example, an IP version.

Still another aspect of the disclosure is to provide a method for processing a PDU session being serviced through the existing non-3GPP access (or non-3gpp access) and processing a registration state through a non-3gpp access if a terminal secedes from a coverage for the non-3gpp access in a situation where the terminal accesses a 5G network through a 3GPP access (or 3gpp access) and the non-3gpp access. If the PDU session is continuously maintained or the registration situation is maintained as it is with respect to the non-3gpp access in the 5G network, unnecessary resources are to be used, and thus it is necessary to provide a method for effectively managing the registration and PDU session for the non-3gpp access through the 3gpp access.

In accordance with an aspect of the disclosure, a method for processing a control signal in a wireless communication system is provided. The method includes receiving a first control signal transmitted from a base station providing processing the received first control signal, and transmitting to the base station a second control signal generated based on the process.

According to an aspect of the disclosure, it is possible to effectively process the registration request message sent by the terminal that performs registration using the temporary user ID through the disclosure.

Further, according to another aspect of the disclosure, the terminal can successfully make the PDU session through selection of the SMF to suit the PDU session type in which the terminal intends to service the traffics to enable the traffic service to be smoothly used through the disclosure.

Further, according to still another aspect of the disclosure, it is possible to efficiently perform the terminal registration management and the PDU session management through the 3gpp access in a situation where the terminal is unable to use the non-3gpp access, such as in a situation where the terminal secedes from the coverage of the non-3gpp access, and thus it is possible to efficiently manage the resources in the 5G network through the disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
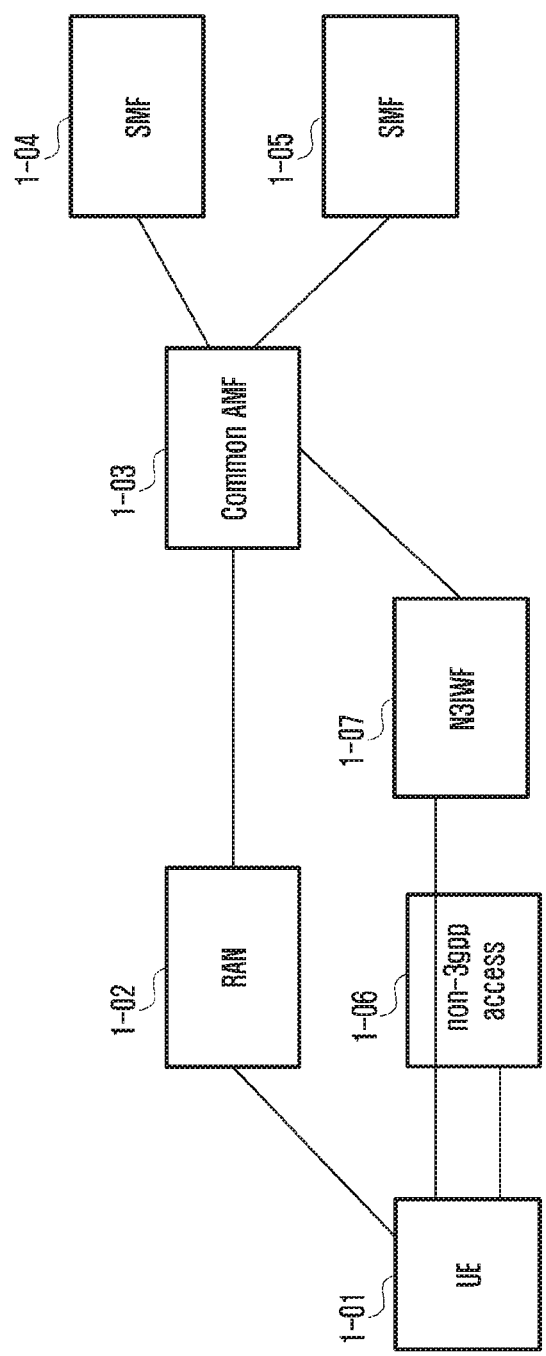
FIG. 1 is a diagram illustrating an example of a cellular network structure using a common AMF if a PLMN of a 3gpp access is the same as a PLMN of an N3IWF when a terminal performs an access through the 3gpp access and a non-3gpp access according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness. In describing the disclosure, related well-known functions or configurations incorporated herein are not described in detail in the case where it is determined that they obscure the subject matter of the disclosure in unnecessary detail.

Further, terms to be described later are terms defined in consideration of their functions in the disclosure, but may differ depending on intentions of a user and an operator or customs. Accordingly, they should be defined based on the contents of the whole description of the disclosure.

The aspects and features of the disclosure and methods for achieving the aspects and features will be apparent by referring to the embodiments to be described in detail with reference to the accompanying drawings. However, the disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

First Embodiment

Hereinafter, the operation principle of the disclosure will be described in detail with reference to the accompanying drawings. In describing the disclosure hereinafter, detailed explanation of the related well-known functions or configurations incorporated herein will be omitted if it is determined that they obscure the subject matter of the disclosure in unnecessary detail. Further, terms to be described later are terms defined in consideration of their functions in the disclosure, but may differ depending on intentions of a user and an operator or customs. Accordingly, they should be defined based on the contents of the whole description of the disclosure.

Hereinafter, terms for identifying a connection node, terms for calling network entities, terms for calling an interface between network entities, and terms for calling various pieces of identification information, as used in the following description, are exemplified for convenience in explanation. Accordingly, the disclosure is not limited to the terms to be described later, but other terms for calling subjects having equal technical meanings may be used.

Hereinafter, for convenience in explanation, terms and titles that are defined in the 5G system standards are used in the disclosure. However, the disclosure is not limited by the terms and titles, but can be equally applied to systems following other standards. Further, a non-3gpp access includes an access through WiFi, and may be equally applied with respect to other accesses excluding the access through 5G.

Hereinafter, a temporary UE ID and a temporary user ID, used in the description and drawings, may be the same parameter having a value allocated to a terminal if the terminal has successfully registered on a 5G network. In an LTE system, the temporary UE ID and the temporary user ID are temporary IDs having the same function as the function of a GUTI, and may be mixedly used for convenience.

FIG. 1 is a diagram illustrating an example of a cellular network structure using a common AMF if a PLMN of a 3gpp access is the same as a PLMN of an N3IWF when a terminal performs an access through the 3gpp access and a non-3gpp access according to an embodiment of the disclosure.

Referring to FIG. 1, when accessing the network through 3gpp access, the terminal (1-01) communicates through the RAN (1-02), common AMF (1-03), SMF (1-04, 1-05) and, when accessing the network through non-3gpp access (1-06), the terminal 1-01 communicates with the N3IWF (1-07), common AMF (1-03), SMF (1-04, 1-05).

Referring to FIG. 1, if a terminal accesses a 5G core network through a 3gpp access, that is, a 5G RAN, and simultaneously accesses the 5G core network through a non-3gpp access, an N3IWF selected by the terminal for this may be in the same PLMN as the PLMN of the non-3gpp access, and in this case, the same common AMF may be selected.

If the terminal performs registration in a state where a valid temporary user ID exists, it transmits a registration request message including the temporary user ID. In this case, it is necessary for the AMF that has received the registration request message to discriminate whether the temporary user ID is a temporary user ID that the terminal has received from the already registered AMF through another access type (e.g., 3gpp access) or a temporary user ID received from the AMF in the previous registration process. That is, if the temporary user ID has been received from the already registered AMF through another access type, the newly selected AMF performs registration through relocation to the AMF to which the temporary user ID was allocated, whereas if the temporary user ID has been received from the AMF in the previous registration process, the newly selected AMF continuously performs the remaining registration process by bring a UE context from the AMF to which the temporary user ID was allocated.

Here, the N3IWF is 5G core network equipment defined for smooth interlocking between the non-3gpp access and the 5G core network, and is an entity that serves to forward a NAS message or data transmitted/received through the non-3gpp access. The N3IWF is also called ngPDG.

Figure 2:
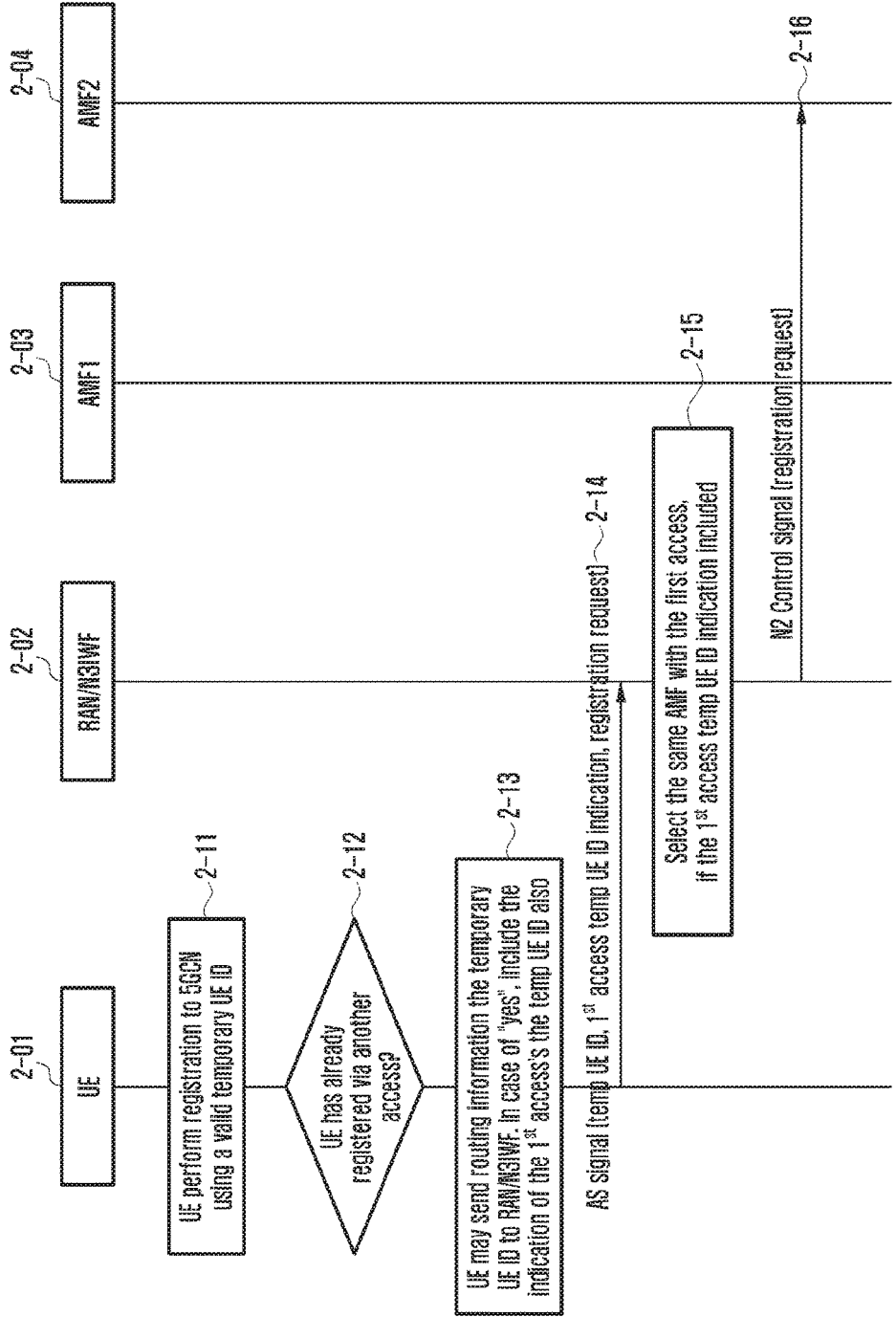
FIG. 2 is a diagram illustrating a process of routing a registration request message based on a temporary user ID when a terminal uses the temporary user ID as routing information being transferred to RAN or N3IWF in a registration process according to an embodiment of the disclosure.

FIG. 2 is a diagram illustrating a process of routing a registration request message based on a temporary user ID when a terminal uses the temporary user ID as routing information being transferred to RAN or N3IWF in a registration process according to an embodiment of the disclosure.

When a terminal 2-01 performs registration (2-11) in a situation where it has a previously allocated temporary user ID, it checks whether it has already been registered through another access type and whether the temperature user ID is a temporary user ID that is managed by an AMF currently serving the terminal (2-12). For example, the terminal may be in a situation where it has already registered on a 5G network through a 3gpp access and uses the temporary user ID issued by the registered AMF, or may be in a situation where it has already registered on the 5G network through a non-3gpp access and uses the temporary user ID issued by the registered AMF.

In this case, when sending the registration request message through an AS layer, the terminal may include the temporary user ID in the registration request message as routing information. In this case, if it is determined that the temporary user ID is a temporary user ID allocated by the AMF serving the terminal through another access type, the terminal adds an indication for notifying that the temporary user ID has been allocated to the terminal during registration through another access. Accordingly, the RAN or N3IWF 2-02 that has received the routing information routes the registration request message to the AMF allocated with the temporary user ID (2-16).

Figure 3:
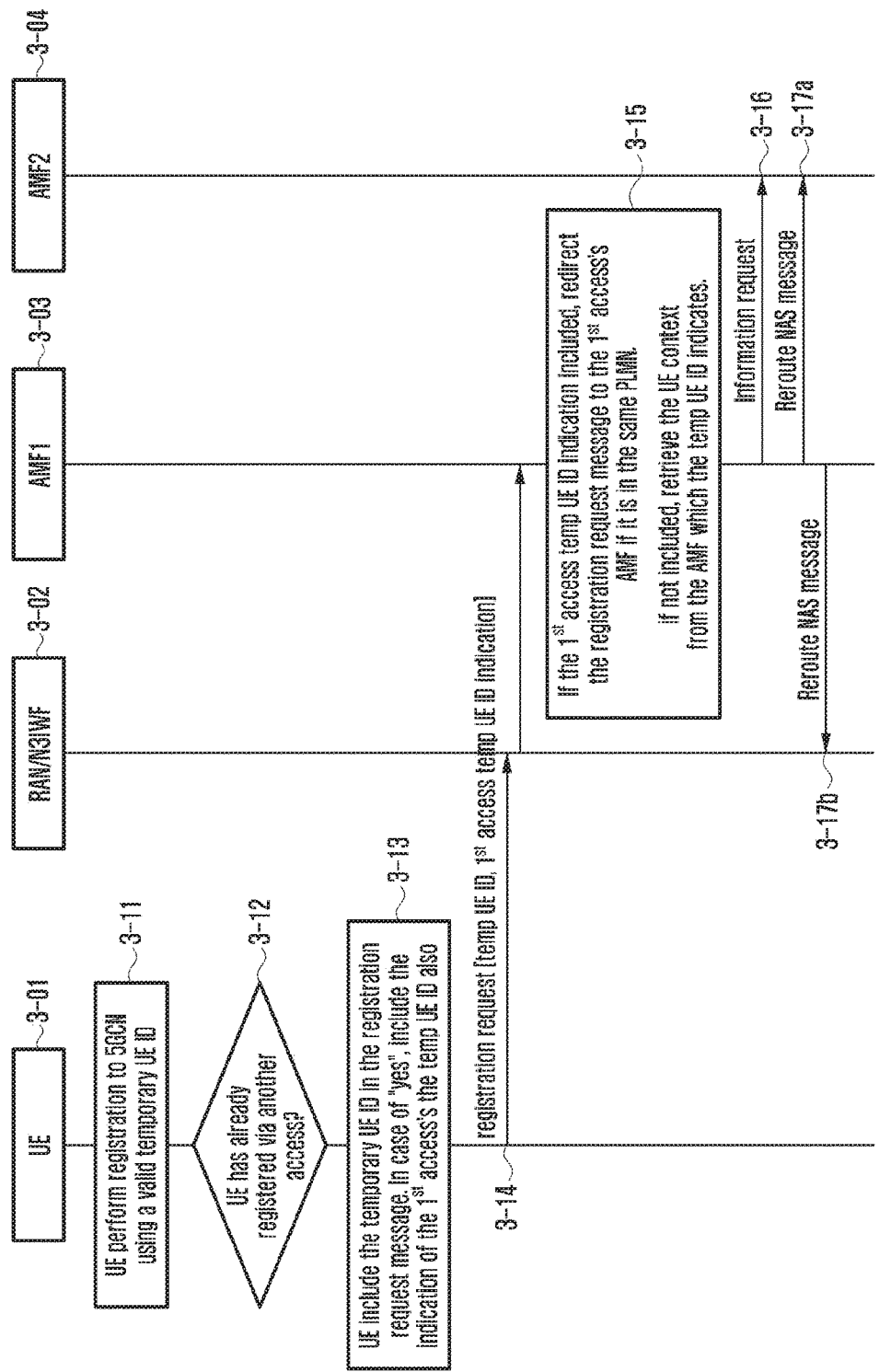
FIG. 3 is a diagram illustrating a process in which an AMF having received a registration request message including a temporary user ID processes a registration request message in a terminal registration process according to an embodiment of the disclosure.

FIG. 3 is a diagram illustrating a process in which an AMF having received a registration request message including a temporary user ID processes a registration request message in a terminal registration process according to an embodiment of the disclosure.

When a terminal 3-01 performs registration (3-11) in a situation where it has a previously allocated temporary user ID, it checks whether it has already been registered through another access type and whether the temperature user ID is a temporary user ID that is managed by an AMF currently serving the terminal (3-12). For example, the terminal may be in a situation where it has already registered on a 5G network through a 3gpp access and uses the temporary user ID issued by the registered AMF, or may be in a situation where it has already registered on the 5G network through a non-3gpp access and uses the temporary user ID issued by the registered AMF.

In this case, the terminal may include the temporary user ID in the registration request message so that it can select a suitable AMF when sending the registration request message. In this case, if it is determined that the temporary user ID is a temporary user ID allocated by the AMF serving the terminal through another access type, the terminal adds an indication for notifying that the temporary user ID has been allocated to the terminal during registration through another access to the registration request message. The AMF having received the registration request message determines a scheme for processing the registration request as in the process (3-15). For example, in order to bring a UE context from the AMF designated by the temporary user ID in a case where an indication for notifying that the temporary user ID has been allocated to the terminal during registration through another access is not included, or an indication for notifying that the temporary user ID is a temporary user ID received during the previous registration is included, the AMF sends an information request message to the AMF designated by the temporary user ID (3-16). In contrast, in case of receiving the registration request message including the indication for notifying that the temporary user ID has been allocated to the terminal during the registration through another access, the AMF recognizes that the attached temporary user ID corresponds to the AMF currently servicing the terminal, and reroutes the registration request message to the AMF designated by the temporary user ID. That is, as in a process (3-17a), the AMF (e.g., AMF1 3-03) may directly send the registration request message that is carried on a reroute NAS message to the AMF (e.g., AMF2 3-04) designated by the temporary user ID, or as in a process (3-17b), it may reroute the registration request message that is carried on the reroute NAS message to the RAN or N3IWF 3-02. In this case, the reroute NAS message may include information on the AMF designated by the temporary user ID.

Figure 4:
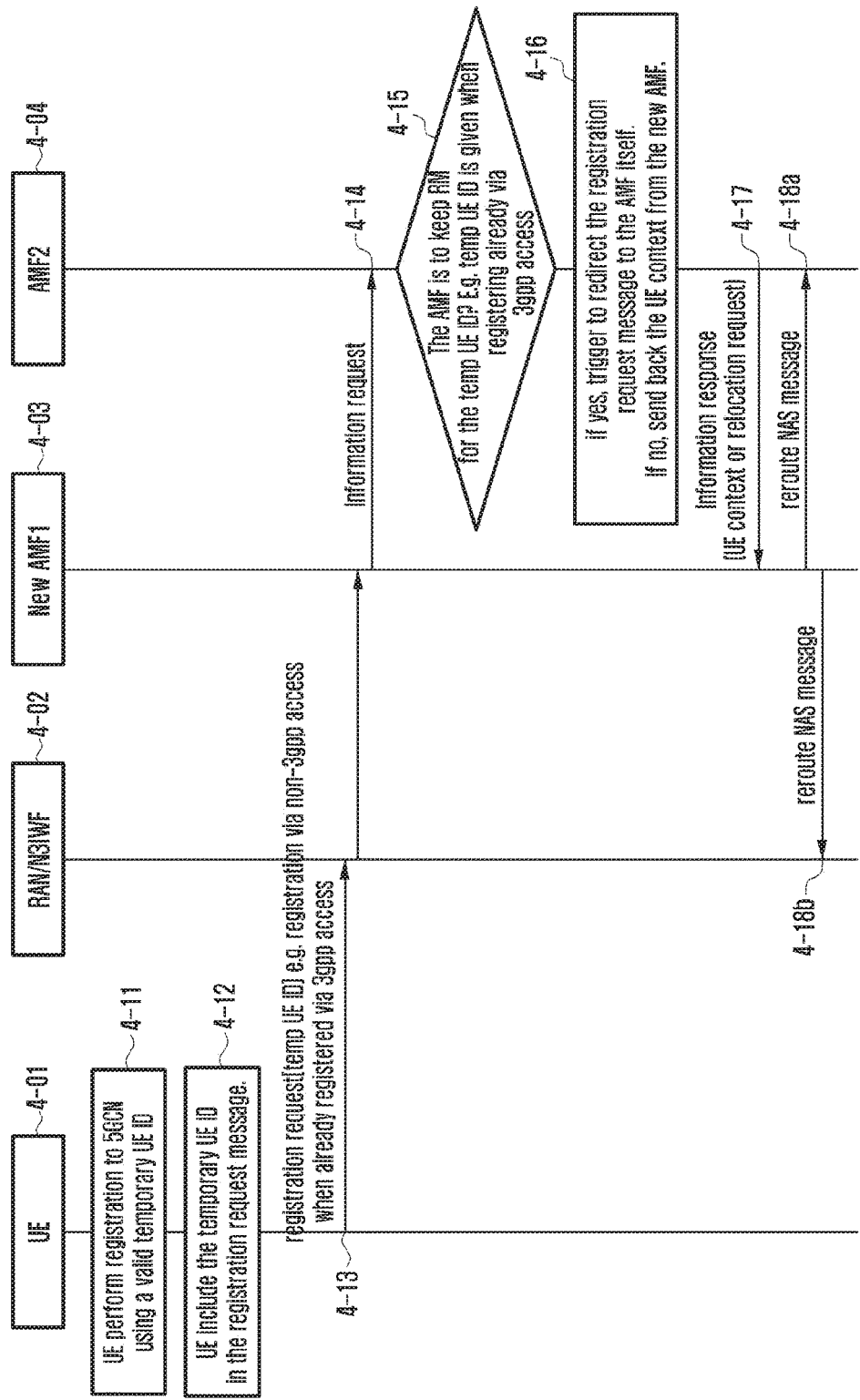
FIG. 4 is a diagram illustrating a process in which an AMF having received a registration request message including a temporary user ID processes a registration request message in a terminal registration process according to an embodiment of the disclosure.

FIG. 4 is a diagram illustrating a process in which an AMF having received a registration request message including a temporary user ID processes a registration request message in a terminal registration process according to an embodiment of the disclosure.

When a terminal 4-01 performs registration (4-11) in a situation where it has a previously allocated temporary user ID, it sends the registration request message including the temporary UE ID (4-13).

If the AMF having received the registration request message does not have a UE context for the temporary UE ID, it sends an information request message to the AMF designated by the temporary UE ID in order to bring a UE context from the AMF designated by the temporary user ID (4-14). The information request message may include parts or all of address information of RAN/N3IWF 4-02 having sent the registration request message, access type related access information, and N2 tunnel information with the AMF.

The AMF (e.g., AMF2 4-04) having received the information request message determines whether to send the UE context for the temporary UE ID to the AMF that has requested the same or to reroute the registration request message to the AMF itself (4-15 and 4-16). That is, if it is determined that the AMF allocates and uses the temporary UE ID during the registration through another access type (e.g., 3gpp access), it reroutes the registration request message transferred through the non-3gpp access to itself in order to use the same AMF regardless of the access type. Here, a method in which the AMF determines that it allocates and uses the temporary UE ID during the registration through another access may be known from information on the access type included in the registration request message, or if the registration type included in the registration request message is "initial registration", the registration through another access type can be known. Further, the registration through another access type may be known through address information of the RAN/N3IWF 4d-02 or access type related access information included in the information request, or the registration through another access type may be known through synthesis and determination of the parts or all of the above-described schemes.

In contrast, in case of changing the AMF through the registration, such as in case of changing the AMF in accordance with movement of the terminal or in case of changing the AMF having performed the registration through the existing non-3gpp access to the AMF for registration through the 3gpp access, the AMF sends the UE context for the temporary UE ID to the AMF that has requested the same (4-16).

Accordingly, in case of changing the AMF when the information response message is sent in the process (4-17), the AMF transfers the UE context to a new AMF having requested the same. In contrast, in case of rerouting the AMF to itself, the AMF may include a relocation request in the information response message to be sent. The new AMF having received the relocation request recognizes that the attached temporary user ID corresponds to the AMF currently servicing the terminal, and reroutes the registration request message to the AMF designated by the temporary user ID. That is, as in a process (4-18*a*), the AMF may directly send the registration request message that is carried on a reroute NAS message to the AMF designated by the temporary user ID, or as in a process (4-18*b*), it may reroute the registration request message that is carried on the reroute NAS message to the RAN or N3IWF 4-02 that has sent the registration request message. In this case, the reroute NAS message may include information on the AMF designated by the temporary user ID.

As another embodiment for rerouting the AMF to itself, the AMF includes relocation completion in an information response message, and the AMF itself serves as a serving AMF. In this case, using the address information of the RAN/N3IWF 4-02 or N2 tunnel information with the AMF included in the information request message, the AMF sends an N2 message to the RAN/N3IWF 4-02 to correct the N2 tunnel information between the AMF and the RAN/N3IWF.

In the embodiments of the disclosure as described above, constituent elements included in the disclosure are expressed in a singular form or in a plural form. However, such a singular or plural expression is selected to suit a situation presented for convenience in explanation, and thus the disclosure is not limited to such singular or plural constituent elements. Even plural constituent elements may be expressed in a singular form, and even a single constituent element may be expressed in a plural form.

On the other hand, although detailed embodiments of the disclosure have been described in the specification and drawings, it will be apparent that various modifications are possible within the scope of the disclosure. Accordingly, the scope of the disclosure should not be limited to the embodiments as described above, but should be defined by the appended claims below and those equivalent to the scope of the claims.

Second Embodiment

Hereinafter, the operation principle of the disclosure will be described in detail with reference to the accompanying drawings. In describing the disclosure hereinafter, detailed explanation of the related well-known functions or configurations incorporated herein will be omitted if it is determined that they obscure the subject matter of the disclosure in unnecessary detail. Further, terms to be described later are terms defined in consideration of their functions in the disclosure, but may differ depending on intentions of a user and an operator or customs. Accordingly, they should be defined based on the contents of the whole description of the disclosure.

Hereinafter, terms for identifying a connection node, terms for calling network entities, terms for calling an interface between network entities, and terms for calling various pieces of identification information, as used in the following description, are exemplified for convenience in explanation. Accordingly, the disclosure is not limited to the terms to be described later, but other terms for calling subjects having equal technical meanings may be used.

Figure 5:
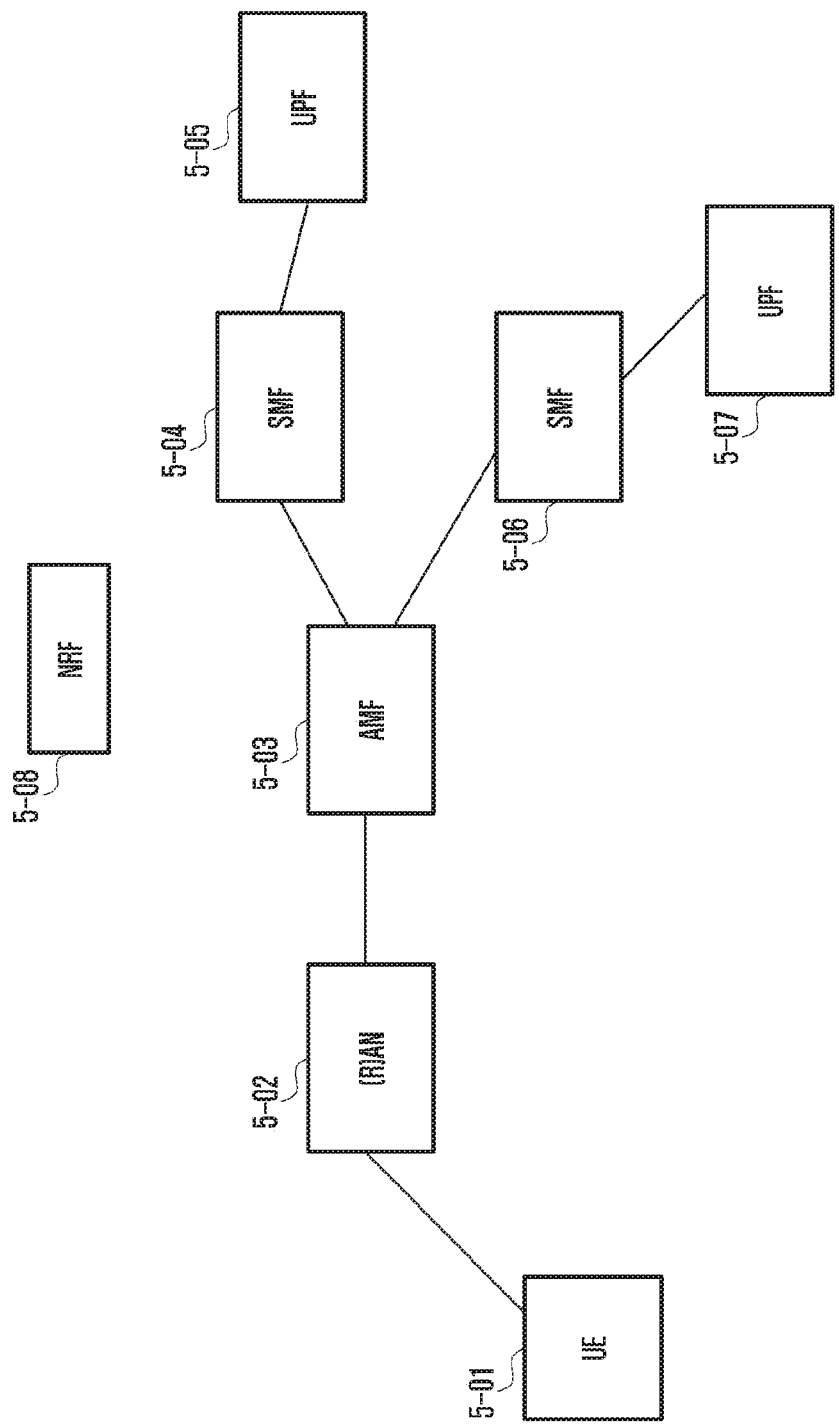
FIG. 5 is a diagram illustrating an example of a 5G network structure for a terminal according to an embodiment of the disclosure.

FIG. 5 is a diagram illustrating an example of a 5G network structure for a terminal according to an embodiment of the disclosure.

Referring to FIG. 5, a terminal performs registration on a 5G core network by accessing an AMF through a (R)AN. If the terminal sends a PDU session establishment request to the AMF through the (R)AN to receive a traffic service, the AMF selects a suitable SMF. In this process, in order to discover the SMF, the AMF requests an NRF to discover the SMF, and in response to this, the NRF transfers address information of the discovered SMF to the AMF to make the AMF select a suitable SMF.

If the PDU session establishment request is transferred to the selected SMF, a PDU session production procedure is performed to allocate an address to the terminal in accordance with the PDU session establishment request, to select a UPF that is a G/W for sending/receiving traffics with outside, and to allocate resource3s.

Figure 6:
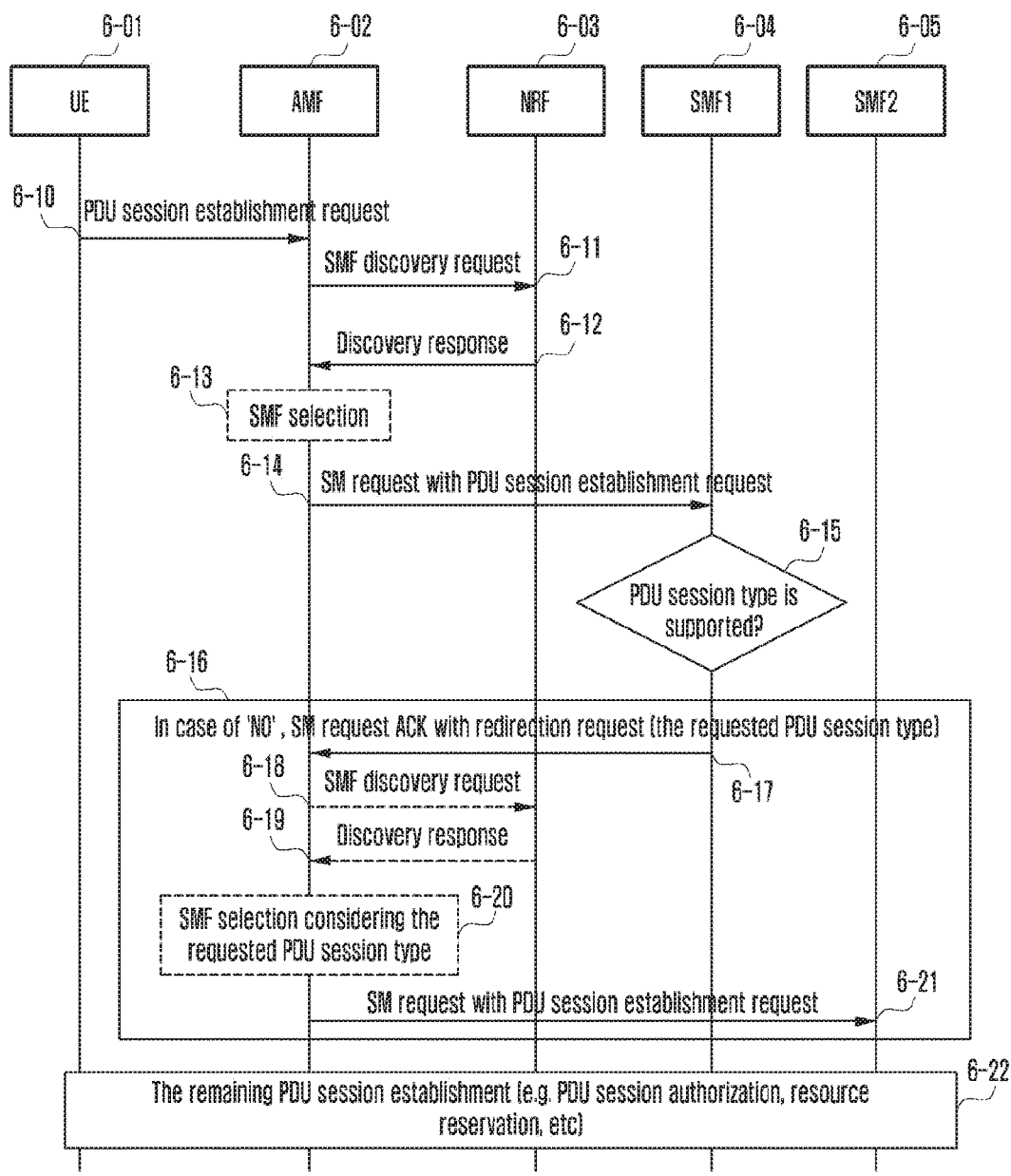
FIG. 6 is a diagram that exemplifies a procedure of selecting an SMF in consideration of a PDU session type and forwarding a PDU session establishment request to the selected SMF when a terminal sends the PDU session establishment request to a 5G network according to an embodiment of the disclosure.

FIG. 6 is a diagram that exemplifies a procedure of selecting an SMF in consideration of a PDU session type and forwarding a PDU session establishment request to the selected SMF when a terminal sends the PDU session establishment request to a 5G network according to an embodiment of the disclosure.

The terminal 6-01 generates and sends a PDU session establishment request to an AMF (6-10). The PDU session establishment request message includes parts or all of DNN or S-NSSAI information requested by the terminal, a PDU session type, and a PDU session ID allocated by the terminal. The PDU session type may be IPv4, IPv6, Ethernet type, or an unstructured PDU session type.

The AMF (e.g., AMF 6-02) having received the PDU session establishment request from UE 6-01, may send an SMF discovery to an NRF 6-03 in consideration of the DNN information or S-NSSAI information (6-11), and in response to this, it receives a discovery response including address information of discovered SMFs (6-12). Based on the received information of the SMFs, the AMF performs SMF selection (6-13).

In particular, as an embodiment for AMF and NRF operation schemes in the above-described processes (6-11, 6-12, and 6-13), if the AMF can receive the PDU session establishment request and analyze the PDU session type in addition to the DNN and S-NSSAI information requested by the terminal, the AMF may request an SMF discovery through inclusion of the PDU session type in addition to the DNN and S-NSSAI information during requesting the SMF discovery at operation 6-11. In response to this, the NRF sends the discovery response including address information or ID information of the SMF satisfying the PDU session type and DNN and S-NSSAI information requested at operation 6-11 (6-12), and the AMF selects a suitable one of the received SMFs (6-13).

As another embodiment for AMF and NRF operation schemes in the above-described processes (6-11, 6-12, and 6-13), if the AMF can receive the PDU session establishment request and analyze the PDU session type in addition to the DNN and S-NSSAI information requested by the terminal, the AMF may request an SMF discovery through inclusion of the DNN and S-NSSAI information during requesting the SMF discovery at operation 6-11. In response to this, the NRF sends the discovery response including address information or ID information of the SMF satisfying the DNN and S-NSSAI information requested at operation 6-11 (6-12), load information of the SMF, and information on the PDU session type supported by the SMF (6-12), and the AMF selects a suitable one of the received SMFs supporting the PDU session type requested by the terminal (6-13).

As still another embodiment for AMF and NRF operation schemes in the above-described processes (6-11, 6-12, and 6-13), although the AMF can receive the PDU session establishment request and analyze the DNN and S-NSSAI information requested by the terminal, but it cannot analyze the PDU session type requested by the terminal, the AMF may request an SMF discovery through inclusion of the DNN and S-NSSAI information during requesting the SMF discovery at operation 6-11. In response to this, the NRF sends the discovery response including address information or ID information of the SMF satisfying the DNN and S-NSSAI information requested at operation 6-11, load information of the SMF, and information on the PDU session type supported by the SMF (6-12), and the AMF selects a suitable one of the received SMFs. However, in this case, since the AMF does not know the information on the PDU session type requested by the terminal, it selects the SMF without considering the PDU session type (6-13). However, the AMF may store SMF information to be used for choosing the SMF later and information on the PDU session types.

On the other hand, after the SMF is selected through the process (6-13), the AMF transfers the PDU session establishment request message included in an SM request message to the selected SMF (6-14).

The SMF having received the request message checks whether it supports the PDU session establishment request requested by the terminal. In particular, the SMF (e.g., SMF1 6-04) checks whether it supports the PDU session type requested by the terminal (6-15). If the SMF supports the PDU session type, it continuously performs the remaining PDU session establishment process, such as authentication/authorization of the PDU session establishment request, UPF allocation, and resource reservation, without reselecting the SMF at operation 6-16 (6-22).

In contrast, if the selected SMF does not support the PDU session type requested by the terminal, it reselects the SMF in accordance with the process (6-16). That is, as sending an ACK to the SM request, the SMF may include a cause so as to indicate that the SM request has not been well processed and to redirect the PDU session establishment request message through selection of another SMF supporting the PDU session type requested by the terminal, and may also include information on the PDU session type requested by the terminal together with the cause.

If the ACK to the SM request is received, the SMF may select a suitable SMF supporting the PDU session type requested by the terminal using SMF address information or ID information acquired at operations 6-11 and 6-12 and information on the PDU session types supported by the SMF, or may grasp information on the SMF again using the NRF. That is, an SMF discovery request message is sent to the NRF (6-18), and in response to this, SMF address information or ID information and information on the PDU session types supported by the SMF are acquired (6-19). Based on the acquired information, a suitable SMF supporting the PDU session type requested by the terminal is selected (6-20).

In particular, as an embodiment for AMF and NRF operation schemes in the above-described processes (6-18, 6-19, and 6-20), the AMF may request the SMF discovery including the PDU session type in addition to the DNN and S-NSSAI information during requesting of the SMF discovery at operation 6-11 in consideration of the PDU session type requested by the terminal and acquired through operation 6-17. In response to this, the NRF sends a discovery response including address information or ID information of the SMF or load information of the SMF satisfying the PDU session type requested at operation 6-18 and DNN and S-NSSAI information (6-19), and the AMF selects a suitable one of the received SMFs (6-20).

As another embodiment for AMF and NRF operation schemes in the above-described processes (6-18, 6-19, and 6-20), the AMF may request the SMF discovery including the DNN and S-NSSAI information during requesting of the SMF discovery at operation 6-11. In response to this, the NRF sends a discovery response including address information or ID information of the SMF or load information of the SMF satisfying the DNN and S-NSSAI information requested at operation 6-18, and information on the PDU session type supported by the SMF (6-19), and the AMF selects a suitable one of the received SMFs supporting the PDU session type requested by the terminal (6-20).

On the other hand, after the SMF is selected through the process (6-20), the AMF transfers the PDU session establishment request message included in the SM request message to the selected SMF (6-21). The SMF having received the PDU session establishment request continuously perform the remaining PDU session establishment process, such as such as authentication/authorization of the PDU session establishment request, UPF allocation, and resource reservation (6-22).

Figure 7:
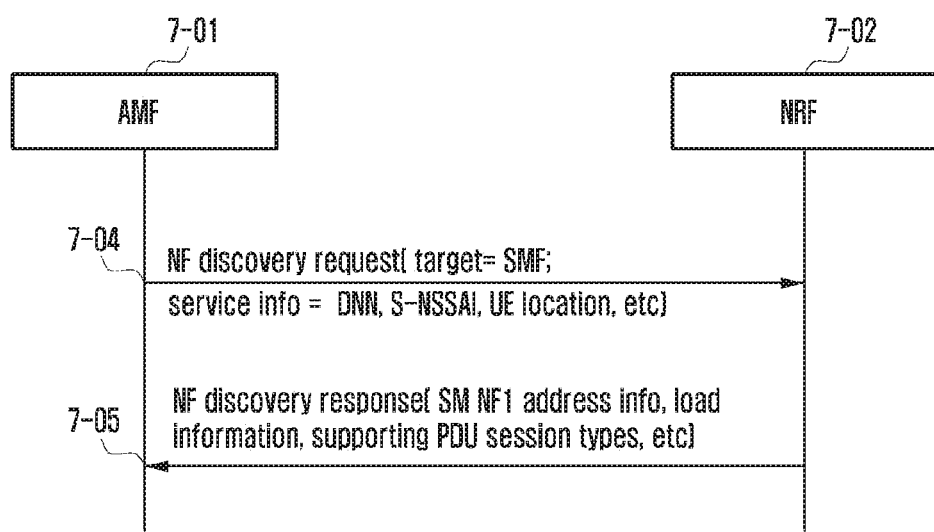
FIG. 7 is a diagram that exemplifies a process in which an AMF discovers a suitable SMF through an NRF according to an embodiment of the disclosure.

FIG. 7 is a diagram that exemplifies a process in which an AMF discovers a suitable SMF through an NRF according to an embodiment of the disclosure.

FIG. 7 is a diagram that exemplifies a process in which an AMF discovers a suitable SMF through an NRF at operations 6-11 and 6-12 or operations 6-18 and 6-19 of FIG. 6 according to the disclosure.

The AMF may receive the PDU session establishment request, and in order to select the SMF, the AMF may request the SMF discovery including DNN and S-NSSAI information and UE location information during requesting of the SMF discovery at operation 7-04. In response to this, the NRF sends the discovery response including address information or ID information of the SMF satisfying information requested at operation 7-05, load information of the SMF, and PDU session type information supported by the SMF (7-05).

If the PDU session type information requested by the terminal is acquired, the AMF selects the SMF supporting the PDU session type requested by the terminal among the discovered SMFs.

Figure 8:
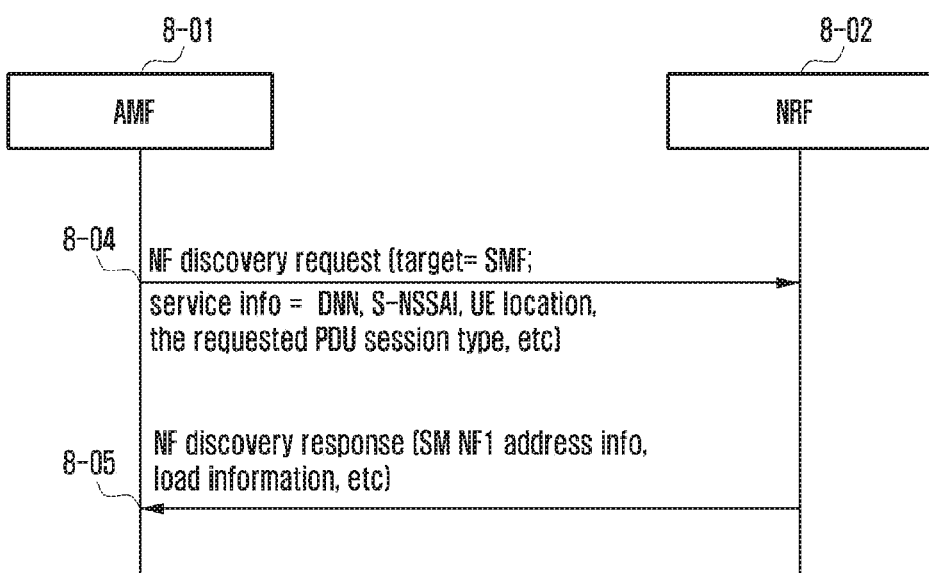
FIG. 8 is a diagram that exemplifies a process in which an AMF discovers a suitable SMF through an NRF according to an embodiment of the disclosure.

FIG. 8 is a diagram that exemplifies a process in which an AMF discovers a suitable SMF through an NRF according to an embodiment of the disclosure.

FIG. 8 is a diagram that exemplifies a process in which an AMF 8-01 discovers a suitable SMF through an NRF 8-02 at operations 6-11 and 6-12 or operations 6-18 and 6-19 of FIG. 6 according to the disclosure.

The AMF 8-01 may receive the PDU session establishment request, and in order to select the SMF, the AMF 8-01 may request the SMF discovery including DNN and S-NSSAI information, UE location information, and PDU session type information requested by the terminal during requesting of the SMF discovery at operation 8-04. In response to this, the NRF 8-02 sends the discovery response including address information or ID information of the SMF satisfying information requested at operation 8-05, and load information of the SMF (8-05).

The AMF selects the SMF among the discovered SMFs.

In the embodiments of the disclosure as described above, constituent elements included in the disclosure are expressed in a singular form or in a plural form. However, such a singular or plural expression is selected to suit a situation presented for convenience in explanation, and thus the disclosure is not limited to such singular or plural constituent elements. Even plural constituent elements may be expressed in a singular form, and even a single constituent element may be expressed in a plural form.

On the other hand, although detailed embodiments of the disclosure have been described in the specification and drawings, it will be apparent that various modifications are possible within the scope of the disclosure. Accordingly, the scope of the disclosure should not be limited to the embodiments as described above, but should be defined by the appended claims below and those equivalent to the scope of the claims.

Third Embodiment

Hereinafter, the operation principle of the disclosure will be described in detail with reference to the accompanying drawings. In describing the disclosure hereinafter, detailed explanation of the related well-known functions or configurations incorporated herein will be omitted if it is determined that they obscure the subject matter of the disclosure in unnecessary detail. Further, terms to be described later are terms defined in consideration of their functions in the disclosure, but may differ depending on intentions of a user and an operator or customs. Accordingly, they should be defined based on the contents of the whole description of the disclosure.

Hereinafter, terms for identifying a connection node, terms for calling network entities, terms for calling an interface between network entities, and terms for calling various pieces of identification information, as used in the following description, are exemplified for convenience in explanation. Accordingly, the disclosure is not limited to the terms to be described later, but other terms for calling subjects having equal technical meanings may be used.

Hereinafter, for convenience in explanation, terms and titles that are defined in the 5G system standards are used in the disclosure. However, the disclosure is not limited by the terms and titles, but can be equally applied to systems following other standards. Further, a non-3gpp access includes an access through WiFi, and may be equally applied with respect to other accesses excluding the access through 5G.

Figure 9:
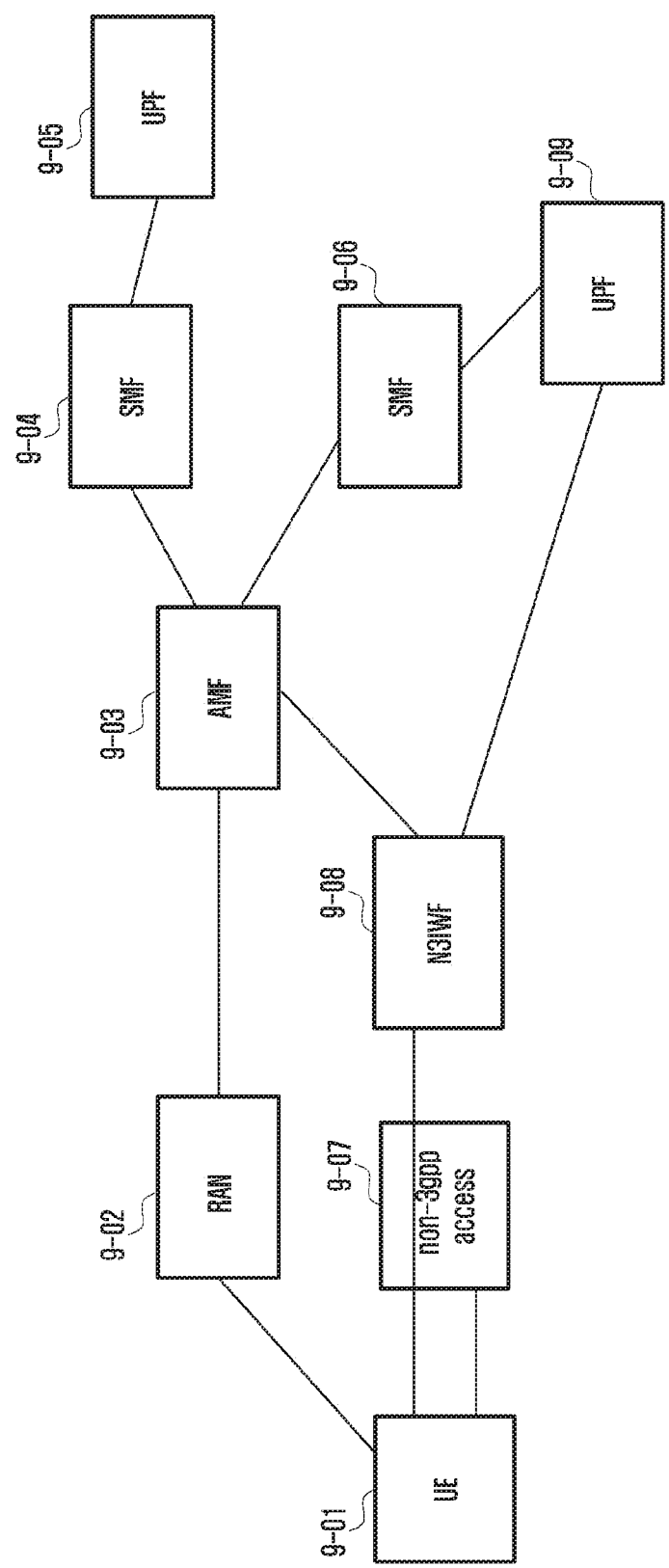
FIG. 9 is a diagram illustrating an example of a structure in which a terminal accesses a 5G network through a 3gpp access and a non-3gpp access according to an embodiment of the disclosure.

FIG. 9 illustrates an example of a structure in which a terminal accesses a 5G network through a non-3gpp access according to an embodiment of the disclosure. In particular, FIG. 9 also illustrates a structure in which the terminal uses a common AMF by accessing through a 3gpp access and the non-3gpp access.

Referring to FIG. 9, when the terminal 9-01 accesses the network through 3gpp access, the terminal 9-01 communicates through the RAN 9-02, AMF 9-03, SMF 9-04, 9-06, UPF 9-05 and 9-09. When the terminal 9-01 accesses the network through the non-3gpp access 9-07, the terminal 9-01 communicates through the N3IWF 9-08, the AMF 9-03, the SMF 9-06), and the UPF (9-09).

Referring to FIG. 9, if a terminal accesses a 5G core network through a 3gpp access, that is, a 5G RAN, and simultaneously accesses the 5G core network through a non-3gpp access, a common AMF is selected. The terminal accesses a 5G core network through a 3gpp access and a non-3gpp access, and the AMF manages registration separately with respect to the 3gpp and non-3gpp.

Here, an N3IWF is 5G core network equipment defined for smooth interlocking between the non-3gpp access and the 5G core network, and is an entity that serves to forward a NAS message or data transmitted/received through the non-3gpp access. The N3IWF is also called ngPDG. The SMF is an entity serving to manage the session and to allocate an IP address to the terminal, and a UPF serves to forward user data under the control of the SMF.

According to an embodiment of the disclosure, in a case where the AMF manages registration through the non-3gpp access, the method for managing the registration may differ depending on whether the corresponding terminal has the registration through the 3gpp access.

For example, if the terminal becomes unable to use the service of the 5G network through the non-3gpp access, such as if the terminal secedes from the coverage of the non-3gpp access or if a non-3gpp access module is switched off, in a state where the corresponding terminal has the registration through the 3gpp access and the registration through the non-3gpp access, the terminal and the 5G core network can efficiently perform resource management by processing a PDU session being serviced by the non-3gpp access through the 3gpp access or by performing deregistration for the non-3gpp access.

Figure 10:
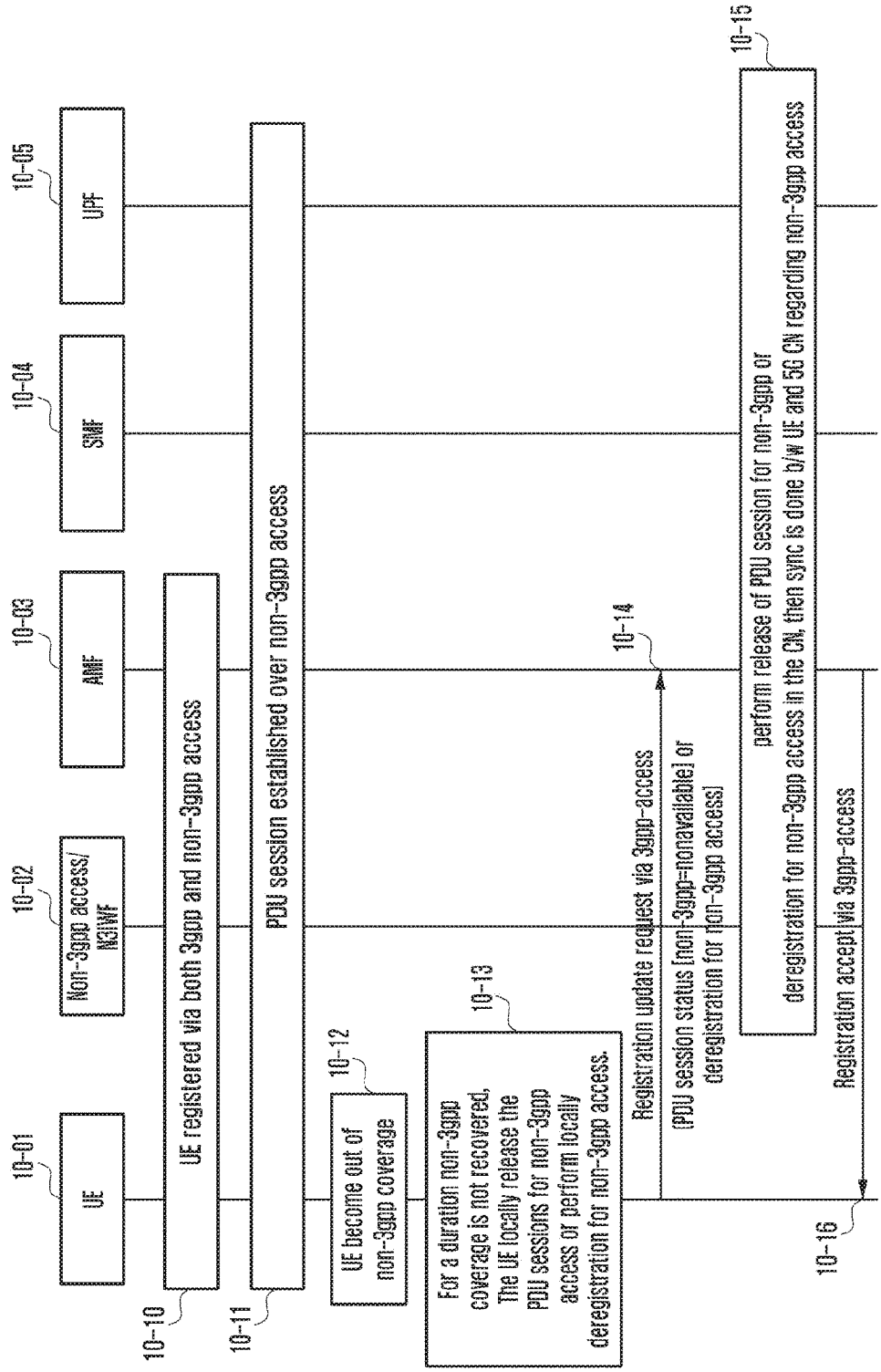
FIG. 10 is a diagram illustrating a process in which a terminal locally releases a PDU session of a non-3gpp access or locally deregisters a non-3gpp if the terminal accessing a 5G network through a 3gpp access and the non-3gpp access is unable to use the non-3gpp access according to an embodiment of the disclosure.

FIG. 10 illustrates a process in which a terminal locally releases a PDU session of a non-3gpp access or locally deregisters a non-3gpp if the terminal accessing a 5G network through a 3gpp access and the non-3gpp access is unable to use the non-3gpp access according to an embodiment of the disclosure.

A terminal 10-01 that has successfully registered on a 5G network through a 3gpp access and a non-3gpp access uses a PDU session generated through the non-3gpp access (10-11).

In this case, if the terminal becomes unable to perform the non-3gpp access, such as if the terminal secedes from a coverage for the non-3gpp access or if a non-3gpp access module is turned off, the terminal operates a timer and waits for until the non-3gpp access can be used again for a predetermined time (10-12).

If the use of the non-3gpp access is still impossible, such as if the terminal returns to the coverage for the non-3gpp access or the non-3gpp access module is turned on again, until the timer expires, the terminal may locally release the PDU sessions being used through the non-3gpp access or may locally perform deregistration for the non-3gpp access in accordance with the existing configuration or a user's input (10-13).

On the other hand, since the terminal has been registered for the 3gpp access, it sends the registration request message to the AMF through the 3gpp access in order to update the registration in accordance with mobility of the terminal or periodically (10-14). In this case, the registration request message may include an item for the PDU session for the non-3gpp access or the deregistration situation.

For example, the terminal may include an indication for notifying the situation in which the terminal has already released the PDU session ID used through the non-3gpp access, or an indication for notifying that the terminal has already performed deregistration for the non-3gpp access.

The AMF having received the registration request message including the above-described indication synchronizes the state for the corresponding PDU session in the 5G core network and the registration state for the non-3gpp access with the terminal in accordance with the above-described indication (10-15).

For example, if the indication indicates that the terminal has already released the PDU session ID used through the non-3gpp access, the AMF sends a PDU session release request to the SMF managing the PDU session corresponding to the PDU session ID to make the SMF and the UPF release the PDU session corresponding to the PDU session ID, and notifies the N3IWF to release a tunnel between the N3IWF and the UPF through the AMF so as to erase the PDU sessions used through the non-3gpp access from the 5G network.

Further, if the indication indicates that the terminal has already released the PDU session ID used through the non-3gpp access, the AMF releases all PDU sessions being used through the non-3gpp access through the PDU session release procedure, and sets deregistration of the registration state for the non-3gpp access.

The processing result may be included in a registration accept message to be sent to the terminal.

That is, the terminal may include an indication for notifying that the PDU session ID, of which the release has been notified by the terminal, has been released or an indication for notifying that the 5G core network has been deregistered for the non-3gpp access (10-16).

Figure 11:
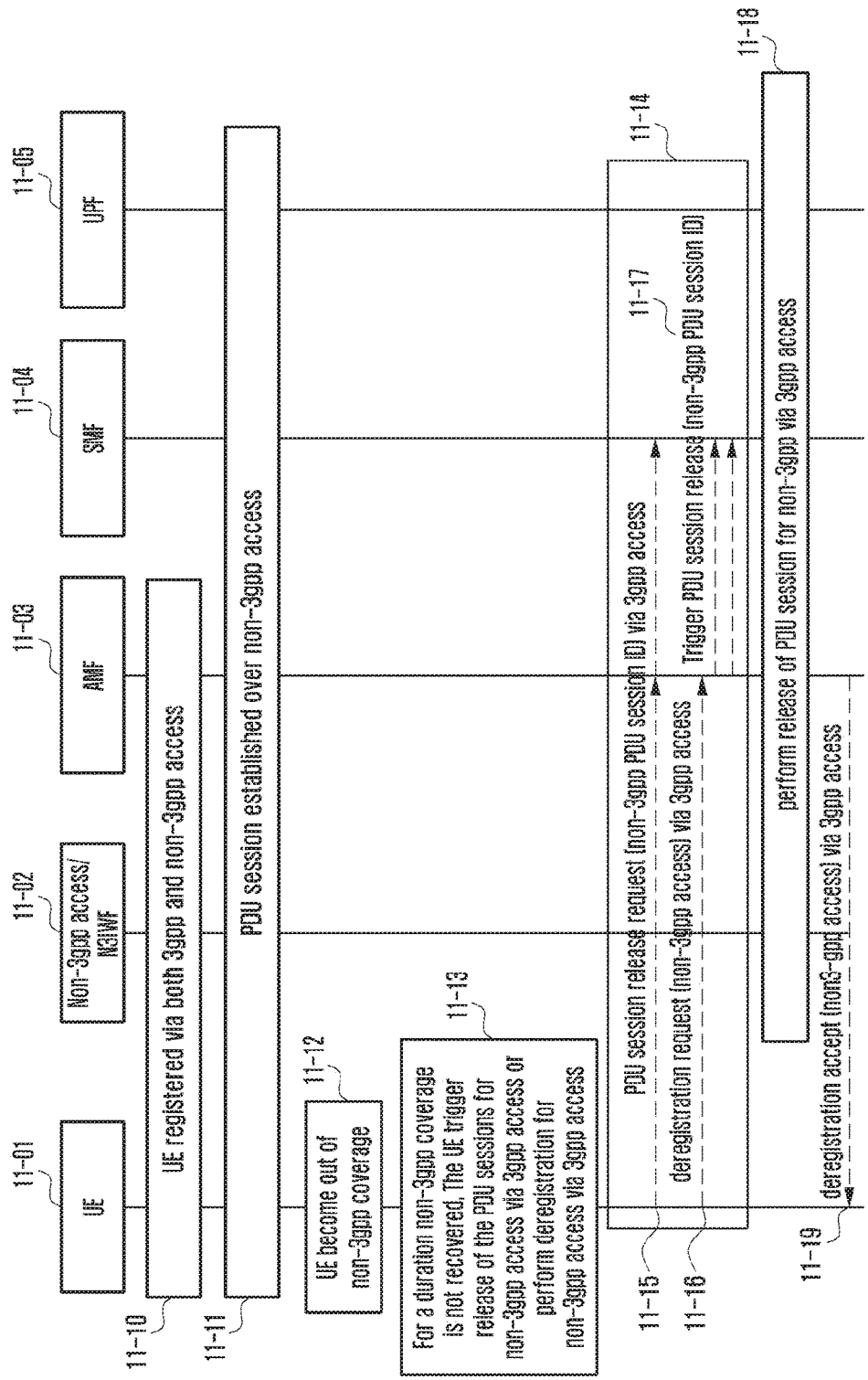
FIG. 11 is a diagram illustrating a process in which a terminal releases a PDU session of a non-3gpp access or deregisters a non-3gpp through a 3gpp access if the terminal accessing a 5G network through the 3gpp access and the non-3gpp access is unable to use the non-3gpp access according to an embodiment of the disclosure.

FIG. 11 illustrates a process in which a terminal releases a PDU session of a non-3gpp access or deregisters a non-3gpp through a 3gpp access if the terminal accessing a 5G network through the 3gpp access and the non-3gpp access is unable to use the non-3gpp access according to an embodiment of the disclosure.

A terminal 11-01 that has successfully registered on a 5G network through a 3gpp access and a non-3gpp access uses a PDU session generated through the non-3gpp access (11-11).

In this case, if the terminal becomes unable to perform the non-3gpp access, such as if the terminal secedes from a coverage for the non-3gpp access or if a non-3gpp access module is turned off, the terminal operates a timer and waits for until the non-3gpp access can be used again for a predetermined time (11-12).

If the use of the non-3gpp access is still impossible, such as if the terminal returns to the coverage for the non-3gpp access or the non-3gpp access module is turned on again, until the timer expires, the terminal may release the PDU sessions being used through the non-3gpp access or may trigger to perform deregistration for the non-3gpp access in accordance with the existing configuration or a user's input (11-13).

For this, the terminal performs a process at operation 11-14, and particularly in a case where the terminal releases the PDU sessions being used through the non-3gpp access, it transfers a PDU session release request message 11-15 to an AMF through the 3gpp access with respect to the corresponding PDU session. The PDU session release message include the corresponding PDU session ID.

The AMF having received the message sends a PDU session release request to the SMF managing the PDU session corresponding to the PDU session ID to make the SMF and the UPF release the PDU session corresponding to the PDU session ID, and notifies the N3IWF to release a tunnel between the N3IWF and the UPF through the AMF so as to erase the PDU sessions used through the non-3gpp access from the 5G network (11-18).

In contrast, if the terminal performs deregistration for the non-3gpp access, it transfers a deregistration request message 11-16 for the non-3gpp access to the AMF through the 3gpp access. The AMF requests the corresponding SMF to release all the PDU sessions being used through the non-3gpp access (11-17). Further, the requested SMF performs a PDU session release (11-18). Further, after performing deregistration for the non-3gpp access, the SMF sends a deregistration accept (non-3gpp access) message to the terminal through the 3gpp access (11-19).

Figure 12:
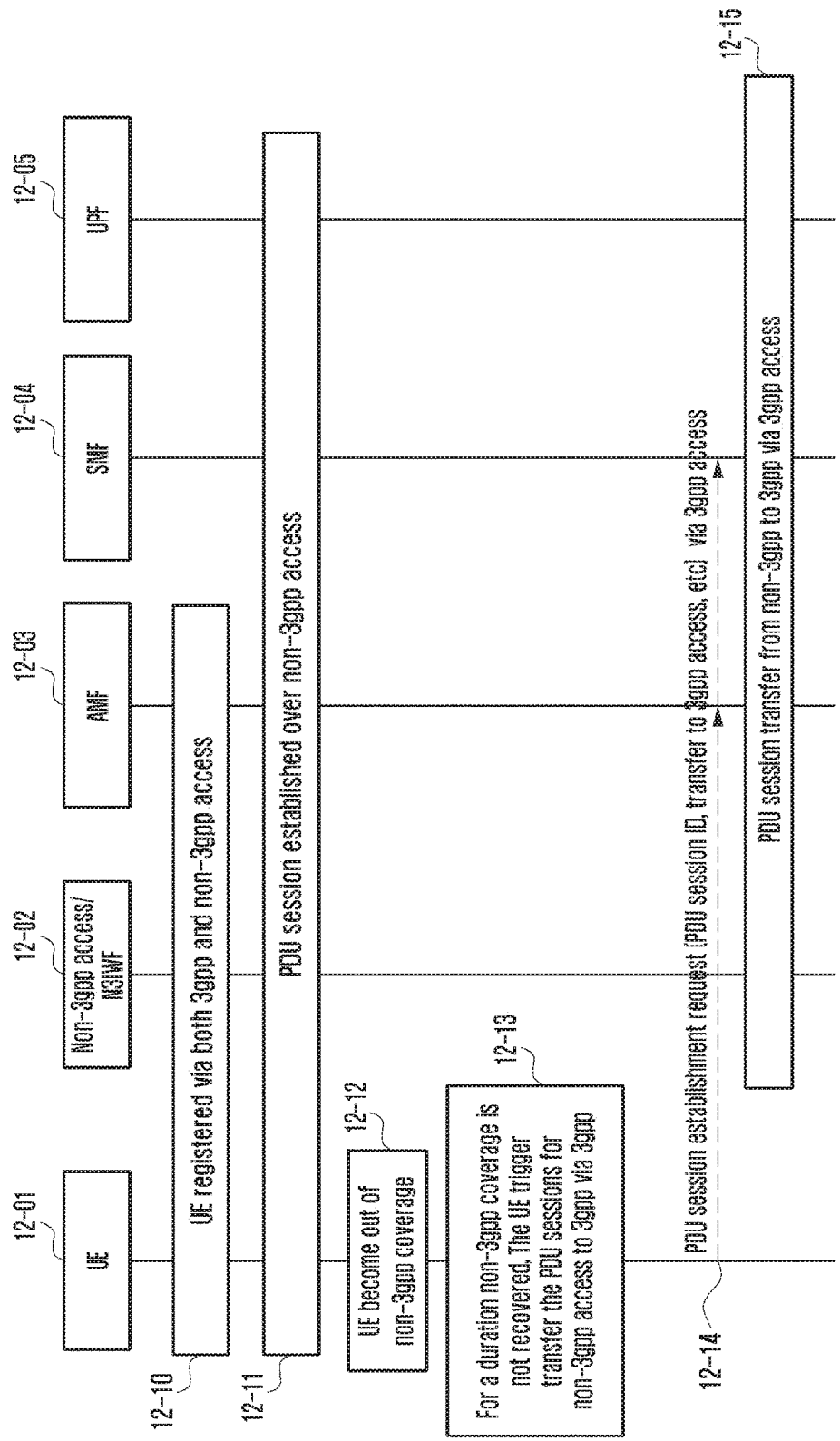
FIG. 12 is a diagram illustrating a process in which a terminal transfers a PDU session of a non-3gpp access to a 3gpp access through the 3gpp access if the terminal accessing a 5G network through the 3gpp access and the non-3gpp access is unable to use the non-3gpp access according to an embodiment of the disclosure.

FIG. 12 illustrates a process in which a terminal transfers a PDU session of a non-3gpp access to a 3gpp access through the 3gpp access if the terminal accessing a 5G network through the 3gpp access and the non-3gpp access is unable to use the non-3gpp access according to an embodiment of the disclosure.

A terminal 12-01 that has successfully registered on a 5G network through a 3gpp access and a non-3gpp access uses a PDU session generated through the non-3gpp access (12-11).

In this case, if the terminal becomes unable to perform the non-3gpp access, such as if the terminal secedes from a coverage for the non-3gpp access or if a non-3gpp access module is turned off, the terminal operates a timer and waits for until the non-3gpp access can be used again for a predetermined time (12-12).

If the use of the non-3gpp access is still impossible, such as if the terminal returns to the coverage for the non-3gpp access or the non-3gpp access module is turned on again, until the timer expires, the terminal may trigger to transfer the PDU sessions being used through the non-3gpp access to the 3gpp access in accordance with the existing configuration or a user's input (12-13).

For this, the terminal transfers a PDU session establishment request message 12-14 to the AMF through the 3gpp access with respect to the corresponding PDU session in order to transfer the PDU sessions being used through the non-3gpp access. The PDU session establishment request message includes the corresponding PDU session ID and an indication for indicating a situation in which the PDU session is transferred to the 3gpp access.

The AMF having received the message sends a PDU session establishment request to the SMF managing the PDU session corresponding to the PDU session ID, and the SMF makes a tunnel for the PDU session through a 5G RAN, that is, 5G base station, through the UPF, and erases the tunnel between the existing UPF and the N3IWF. Accordingly, the PDU session is transferred so that the PDU session is serviced through the 3gpp access rather than the non-3gpp access (12-15), and the UPF through the AMF so as to erase the PDU sessions used through the non-3gpp access from the 5G network (11-18).

Figure 13:
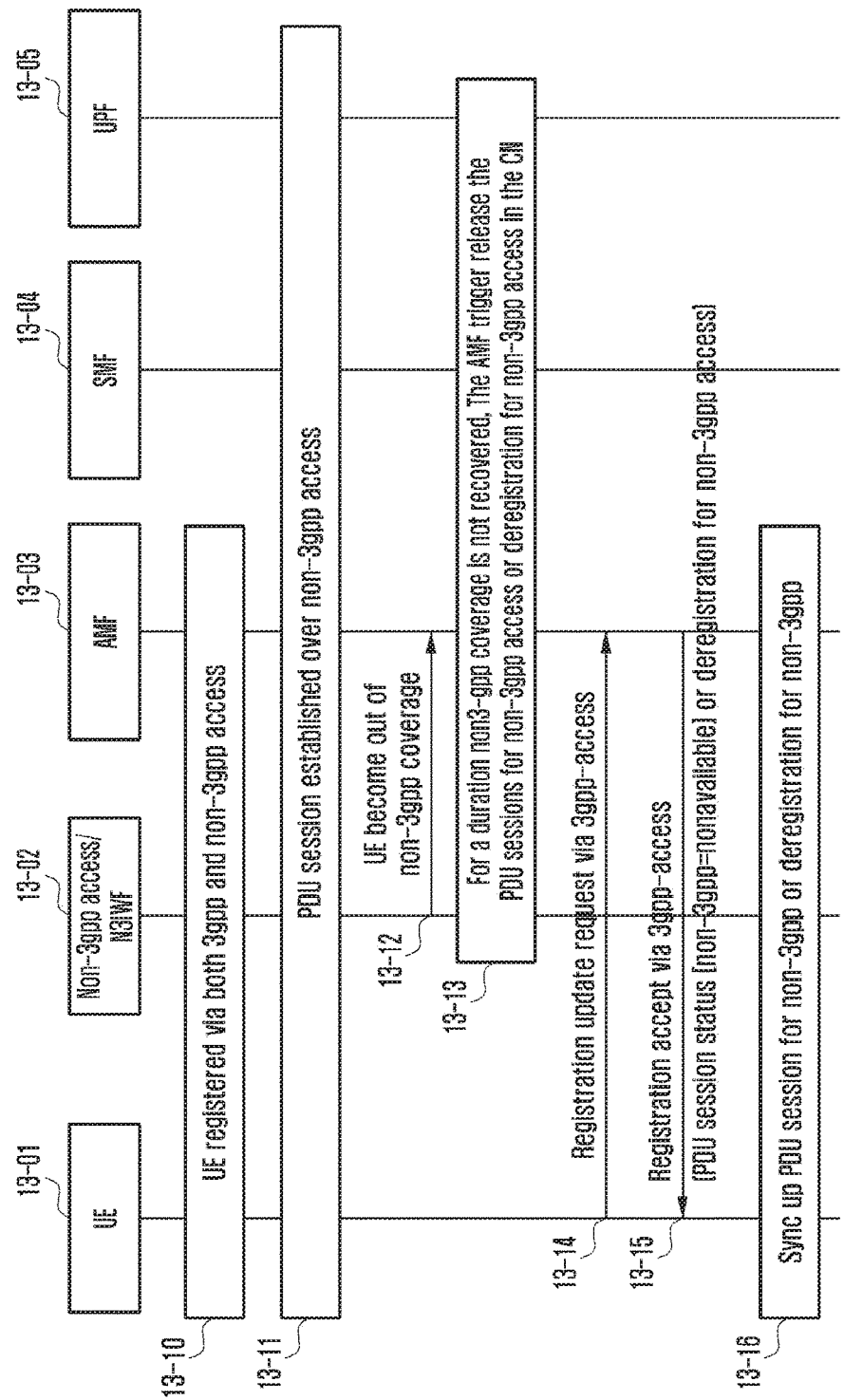
FIG. 13 is a diagram illustrating a process of releasing a PDU session of a non-3gpp access or deregistering a non-3gpp if an AMF recognizes through an N3IWF that a terminal accessing a 5G network through a 3gpp access and the non-3gpp access is unable to use the non-3gpp access according to an embodiment of the disclosure.

FIG. 13 illustrates a process of releasing a PDU session of a non-3gpp access or deregistering a non-3gpp if an AMF recognizes through an N3IWF that a terminal accessing a 5G network through a 3gpp access and the non-3gpp access is unable to use the non-3gpp access according to an embodiment of the disclosure.

A terminal 13-01 that has successfully registered on a 5G network through a 3gpp access and a non-3gpp access uses a PDU session generated through the non-3gpp access (13-11).

In this case, if the terminal becomes unable to perform the non-3gpp access, such as if the terminal secedes from a coverage for the non-3gpp access or if a non-3gpp access module is turned off, and the N3IWF 13-02 notifies the AMF that the non-3gpp access becomes impossible, the AMF operates a timer and waits for until the non-3gpp access can be used again for a predetermined time (13-12).

If the use of the non-3gpp access is still impossible until the timer expires, the AMF may release the PDU session being used through the non-3gpp access in accordance with the configuration or policy of an operator. In this case, the AMF may send a PDU session release request to the SMF managing the PDU session being used through the non-3gpp access to make the SMF and UPF release the PDU session corresponding to the PDU session ID, and may notify the N3IWF through the AMF to release a tunnel between the N3IWF and the UPF so as to erase the PDU sessions used through the non-3gpp access from the 5G network.

In contrast, if the AMF performs deregistration for the non-3gpp access in accordance with the configuration or the policy of the operator, it requests the corresponding SMF to release all the PDU sessions being used through the non-3gpp access. The SMF having been requested releases the PDU session release, and switches the non-3gpp access to a deregistration state (13-18).

On the other hand, since the terminal has been registered for the 3gpp access, it sends the registration request message to the AMF through the 3gpp access in order to update the registration in accordance with mobility of the terminal or periodically (13-14). In response to this, the AMF sends to the terminal a registration accept message including an indication for notifying that the PDU session for the non-3gpp access is to be released or an indication for notifying that the 5G core network has performed deregistration for the non-3gpp access (10-15). Based on the received indication, the terminal may match synchronization with the 5G core network, such as the terminal locally releases the PDU session for the non-3gpp access, or locally performs deregistration for the non-3gpp access.

Figure 14:
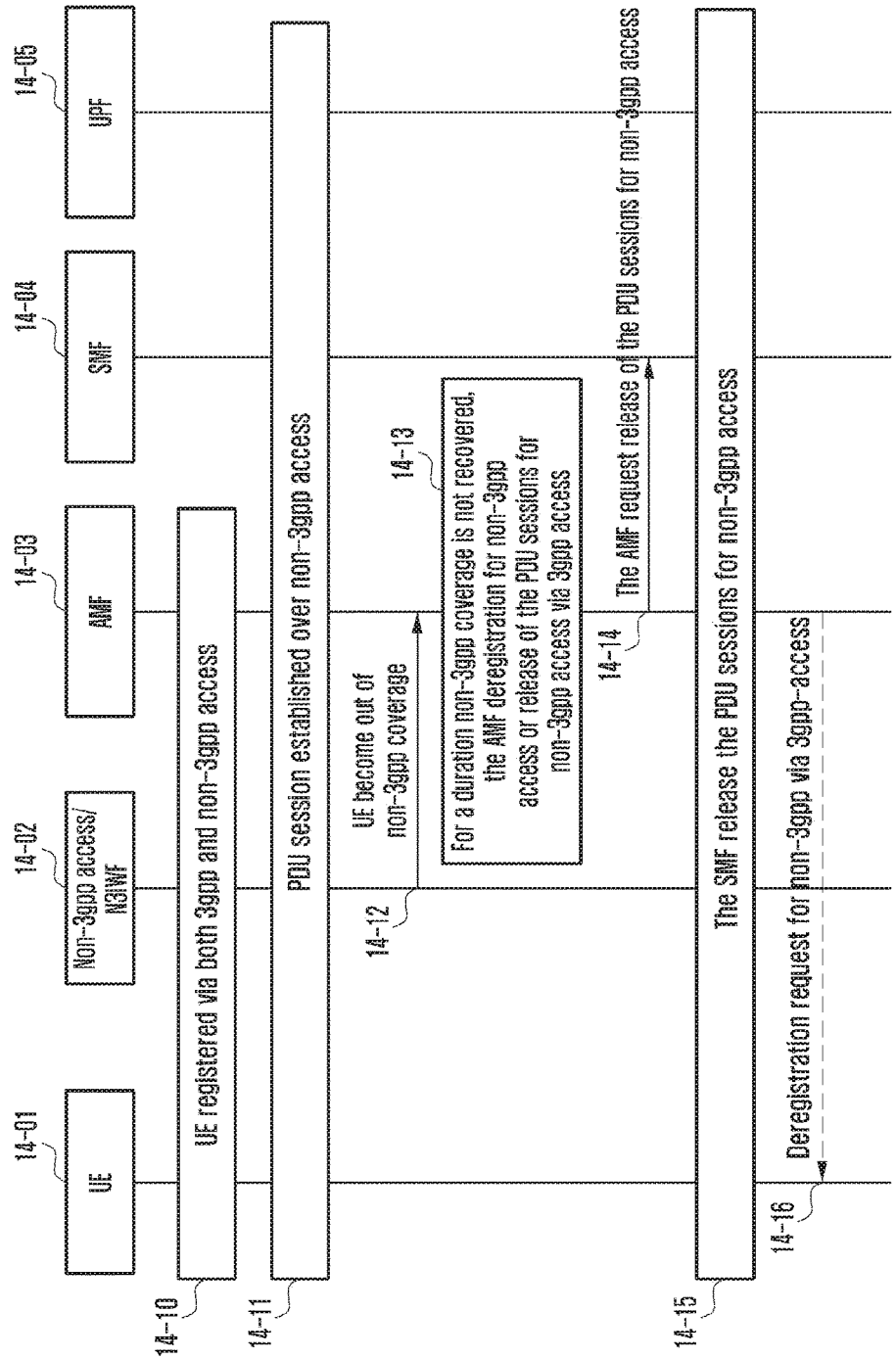
FIG. 14 is a diagram illustrating a process of releasing a PDU session of a non-3gpp access or deregistering a non-3gpp through a 3gpp access if an AMF recognizes through an N3IWF that a terminal accessing a 5G network through the 3gpp access and the non-3gpp access is unable to use the non-3gpp access according to an embodiment of the disclosure.

FIG. 14 illustrates a process of releasing a PDU session of a non-3gpp access or deregistering a non-3gpp through a 3gpp access if an AMF recognizes through an N3IWF that a terminal accessing a 5G network through the 3gpp access and the non-3gpp access is unable to use the non-3gpp access according to an embodiment of the disclosure.

A terminal 14-01 that has successfully registered on a 5G network through a 3gpp access and a non-3gpp access uses a PDU session generated through the non-3gpp access (14-11).

In this case, if the terminal becomes unable to perform the non-3gpp access, such as if the terminal secedes from a coverage for the non-3gpp access or if a non-3gpp access module is turned off, and the N3IWF 14-02 notifies the AMF that the non-3gpp access becomes impossible, the AMF operates a timer and waits for until the non-3gpp access can be used again for a predetermined time (14-12).

If the use of the non-3gpp access is still impossible until the timer expires, the AMF may release the PDU session being used through the non-3gpp access in accordance with the configuration or policy of an operator. In this case, the AMF sends a PDU session release request 14-14 to the SMF managing the PDU session being used through the non-3gpp access, and the SMF performs a NW initiated PDU session release process so as to release the PDU session corresponding to the PDU session ID, and notifies the N3IWF through the AMF to release a tunnel between the N3IWF and UPF, so as to erase the PDU sessions used through the non-3gpp access from the 5G network (14-15).

In contrast, if the AMF performs deregistration for the non-3gpp access in accordance with the configuration or the policy of the operator, it sends the PDU session release request 14-14 to the SMF managing the PDU session being used through the non-3gpp access, and the SMF performs the NW initiated PDU session release process so as to release the PDU session corresponding to the PDU session ID, and notifies the N3IWF through the AMF to release the tunnel between the N3IWF and the UPF, so as to erase the PDU sessions used through the non-3gpp access from the 5G network (14-15). Further, in order to perform deregistration for the non-3gpp access, the AMF sends a NW triggered deregistration request (non-3gpp access) to the terminal (14-16).

Figure 15:
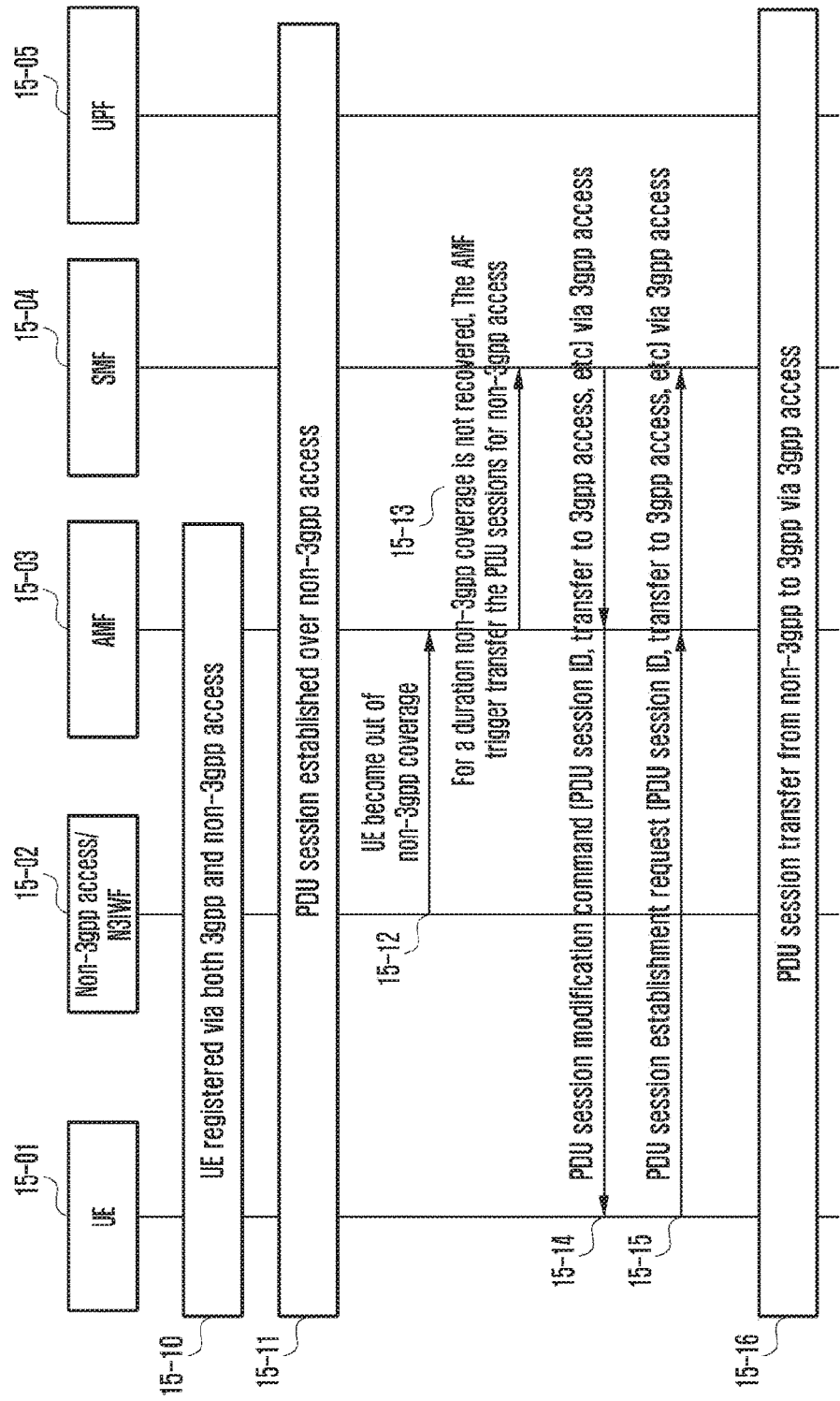
FIG. 15 is a diagram illustrating a process of switching a PDU session of a non-3gpp access to a 3gpp access through the 3gpp access if an AMF recognizes through an N3IWF that a terminal accessing a 5G network through the 3gpp access and the non-3gpp access is unable to use the non-3gpp access according to an embodiment of the disclosure.

FIG. 15 illustrates a process of switching a PDU session of a non-3gpp access to a 3gpp access through the 3gpp access if an AMF recognizes through an N3IWF that a terminal accessing a 5G network through the 3gpp access and the non-3gpp access is unable to use the non-3gpp access according to an embodiment of the disclosure.

A terminal 15-01 that has successfully registered on a 5G network through a 3gpp access and a non-3gpp access uses a PDU session generated through the non-3gpp access (15-11).

In this case, if the terminal becomes unable to perform the non-3gpp access, such as if the terminal secedes from a coverage for the non-3gpp access or if a non-3gpp access module is turned off, and the N3IWF 15-02 notifies the AMF that the non-3gpp access becomes impossible, the AMF operates a timer and waits for until the non-3gpp access can be used again for a predetermined time (15-12).

If the use of the non-3gpp access is still impossible until the timer expires, the AMF may release the PDU session being used through the non-3gpp access in accordance with the configuration or policy of an operator. In this case, the AMF may send a PDU session release request 15-13 to the SMF managing the PDU session being used through the non-3gpp access, and may send a PDU session modification request to the terminal so as to switch the PDU session corresponding to the PDU session ID to the 3gpp access. The request message includes the PDU session ID and an indication indicating switchover to the 3gpp access (15-14).

The terminal having received the request transfers a PDU session establishment request message 15-15 to the AMF through the 3gpp access with respect to the corresponding PDU session in order to transfer the PDU sessions being used through the non-3gpp access to the 3gpp access. The PDU session establishment request message includes the corresponding PDU session ID and an indication for indicating a situation in which the PDU session is transferred to the 3gpp access.

The AMF having received the message sends the PDU session establishment request message to the SMF managing the PDU session corresponding to the PDU session ID, and the SMF makes a tunnel for the PDU session through a 5G RAN, that is, 5G base station, through the UPF, and erases the tunnel between the existing UPF and the N3IWF. Accordingly, the PDU session is transferred so that the PDU session is serviced through the 3gpp access rather than the non-3gpp access (15-16).

Figure 16:
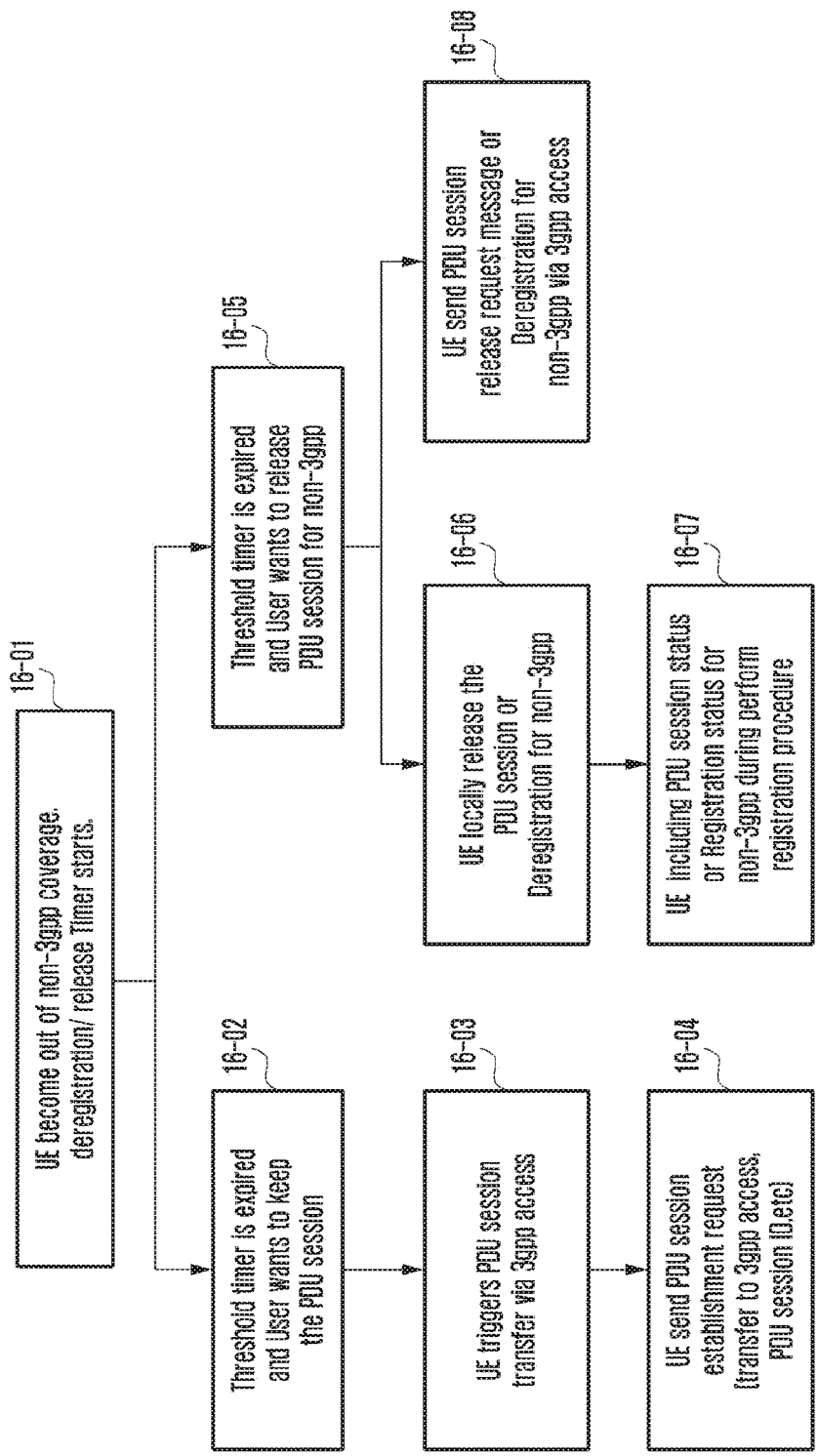
FIG. 16 is a diagram illustrating a process of performing registration management and connection management if a terminal accessing a 5G network through a 3gpp access and a non-3gpp access recognizes that it is unable to use the non-3gpp access according to an embodiment of the disclosure.

FIG. 16 illustrates a process of performing registration management and connection management if a terminal accessing a 5G network through a 3gpp access and a non-3gpp access recognizes that it is unable to use the non-3gpp access according to an embodiment of the disclosure.

If a terminal that has successfully registered on a 5G network through a 3gpp access and a non-3gpp access uses a PDU session generated through the non-3gpp access becomes unable to perform the non-3gpp access, such as if the terminal secedes from a coverage for the non-3gpp access or if a non-3gpp access module is turned off, it operates a timer and waits for until the non-3gpp access can be used again for a predetermined time (16-01).

If the terminal is set to switch a PDU session for the non-3gpp access to the 3gpp access or a user selects to do so in a state where the use of the non-3gpp access is impossible until the timer expires (16-02), the terminal starts a procedure of transferring the PDU session for the non-3gpp access to the 3gpp access 16-03), and for this, the terminal sends a PDU session establishment request message to the SMF through an AMF to switch the PDU session to be used through the 3gpp access. For this, the PDU session establishment request message includes a PDU session ID of the PDU session to be transferred and an indication for notifying the switchover to the 3gpp access.

On the other hand, if the terminal is set to release the PDU session for the non-3gpp access or the user selects to do so in a state where the use of the non-3gpp access is impossible until the timer expires (16-05), the terminal locally releases the PDU session for the non-3gpp access, or performs local deregistration for the non-3gpp access according to the setting (16-06). Thereafter, when the terminal performs registration update through the 3gpp access, the registration request message may include an indication for notifying that the PDU session for the non-3gpp access is to be released or an indication for notifying that the local deregistration has been performed for the non-3gpp access (16-07).

On the other hand, the terminal may send a PDU session release request to release the PDU session for the non-3gpp access, or may send a UE requested deregistration request (non-3gpp access) message to the 5G core network for the deregistration for the non-3gpp access in accordance with the setting (16-08).

Figure 17:
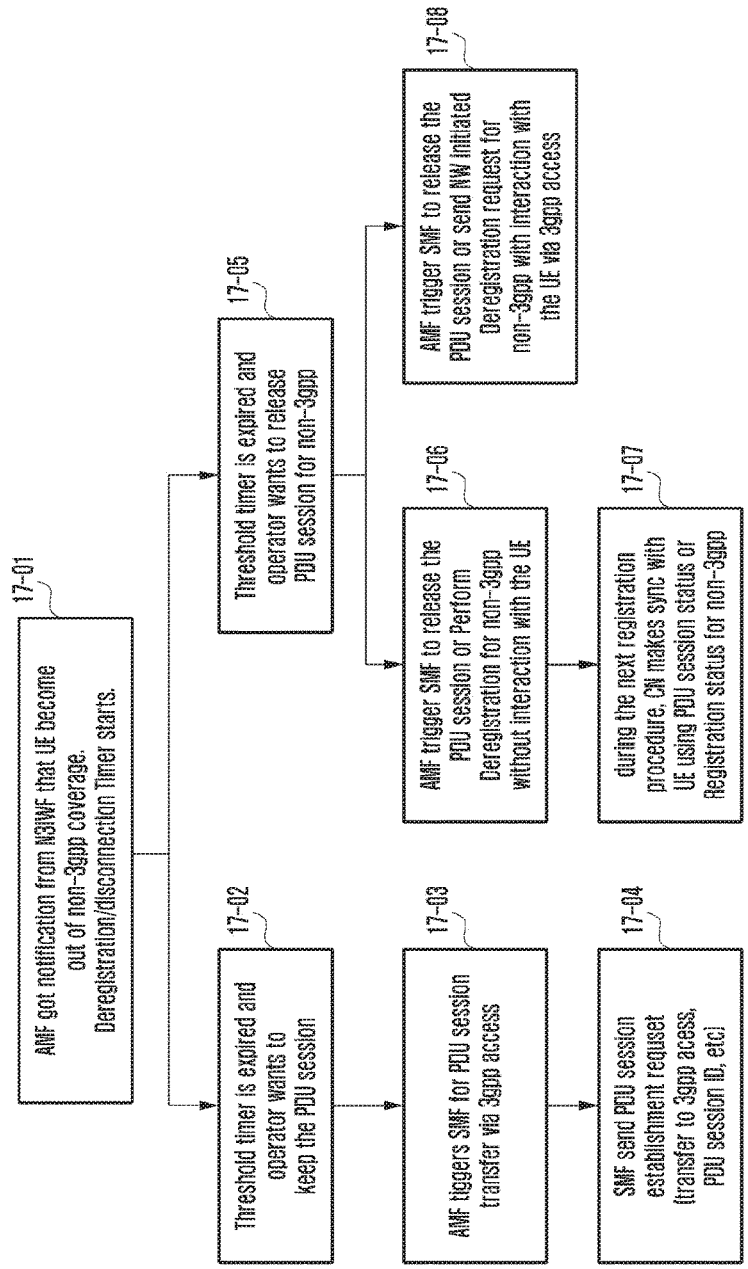
FIG. 17 is a diagram illustrating a process of performing registration management and connection management if an AMF recognizes through an N3IWF that a terminal accessing a 5G network through a 3gpp access and a non-3gpp access is unable to use the non-3gpp access according to an embodiment of the disclosure.

FIG. 17 illustrates a process of performing registration management and connection management if an AMF recognizes through an N3IWF that a terminal accessing a 5G network through a 3gpp access and a non-3gpp access is unable to use the non-3gpp access according to an embodiment of the disclosure.

If a terminal that has successfully registered on a 5G network through a 3gpp access and a non-3gpp access becomes unable to perform the non-3gpp access, such as if the terminal secedes from a coverage for the non-3gpp access or if a non-3gpp access module is turned off, and an N3IWF notifies an AMF that the non-3gpp access becomes impossible, the AMF operates a timer and waits for until the non-3gpp access can be used again for a predetermined time (17-01).

If it is set to switch a PDU session for the non-3gpp access to the 3gpp access or a service provider's policy selects to do so in a state where the use of the non-3gpp access is impossible until the timer expires (17-02), the AMF requests the SMF to perform a procedure of transferring the PDU session for the non-3gpp access to the 3gpp access (17-03). For this, the SMF sends a PDU session modification request to the terminal to switch the PDU session to the 3gpp access (17-04).

The terminal sends a PDU session establishment request message to the SMF through the AMF to switch the PDU session through the 3gpp access. For this, the PDU session establishment request message includes a PDU session ID of the PDU session to be transferred and an indication for notifying the switchover to the 3gpp access.

On the other hand, if it is set to release the PDU session for the non-3gpp access or the service provider's policy selects to do so in the 5G core network in a state where the use of the non-3gpp access is impossible until the timer expires (17-05), the AMF releases the PDU session for the non-3gpp access through the SMF, or performs local deregistration for the non-3gpp access according to the setting (17-06). Thereafter, when the terminal performs registration update through the 3gpp access, the registration accept message may include an indication for notifying that the PDU session for the non-3gpp access is to be released or an indication for notifying that the local deregistration has been performed for the non-3gpp access (17-07).

On the other hand, the AMF may send a PDU session release request to the terminal through the 3gpp access in order to release the PDU session for the non-3gpp access through the SMF, or may send a NW-requested deregistration request (non-3gpp access) message to the terminal through the 3gpp access for the deregistration for the non-3gpp access in accordance with the setting (17-08).

Figure 18:
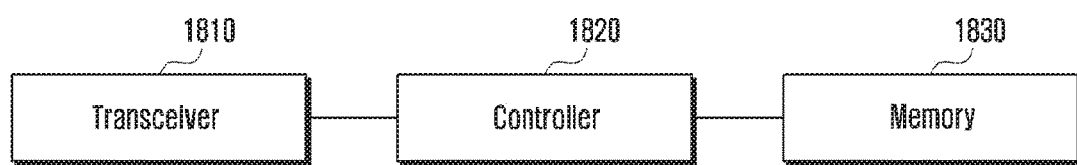
FIG. 18 is a diagram illustrating a structure of a network entity according to an embodiment of the disclosure.

FIG. 18 is a diagram illustrating a structure of a network entity according to embodiments of the disclosure. The network entity may refer to each configuration of the network shown in FIG. 1 to FIG. 17. For example, referring to FIG. 1, the network entity may be a base station (RAN), Common AMF, SMF, N3IWF, and the like. For example, referring to FIG. 5, the network entity may be RAN, AMF, NRF, SMF, UPF, and the like. For example, referring to FIG. 9, the network entity may be RAN, AMF, NRF, SMF, UPF, N3IWF, and the like.

Referring to FIG. 18, the network entity may include a transmission/reception unit (or transceiver) 1810, a control unit (or a controller or at least one processor) 1820, and a storage unit 1830 (e.g., a memory). In the disclosure, the control unit may be defined as a circuit or an application specific integrated circuit or at least one processor.

The transmission/reception unit 1810 may transmit and receive signals to or from a terminal or another network entity. The control unit 1820 may control the overall operation of the network entity according to the embodiment of the disclosure. For example, the control unit 1820 may control the signal flow between each block to perform the operation according to the flowcharts described above.

The storage unit 1830 may store at least one of information transmitted and received through the transmission/reception unit 1810 and information generated through the control unit 1820.

Figure 19:
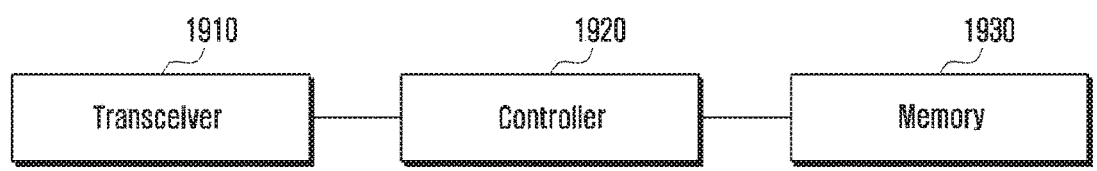
FIG. 19 is a diagram illustrating a structure of a terminal according to an embodiment of the disclosure.

FIG. 19 is a diagram illustrating a structure of a terminal according to an embodiment of the disclosure.

Referring to FIG. 19, the terminal may include a transmission/reception unit (or transceiver) 1910, a control unit (or a controller or at least one processor) 1920, and a storage unit 1930 (e.g., a memory). In the disclosure, the control unit may be defined as a circuit or an application specific integrated circuit or at least one processor.

The transmitting/receiving unit 1910 may transmit and receive signals with other network entities. The transmitting/receiving unit 1910 may receive system information from, for example, a base station and may receive a synchronization signal or a reference signal.

The control unit 1920 can control the overall operation of the terminal according to the embodiment of the disclosure. For example, the control unit 1920 may control the signal flow between each block to perform the operation according to the flowcharts described above.

The storage unit 1930 may store at least one of information transmitted and received through the transmitting/receiving unit 1910 and information generated through the control unit 1920.

In the embodiments of the disclosure as described above, constituent elements included in the disclosure are expressed in a singular form or in a plural form. However, such a singular or plural expression is selected to suit a situation presented for convenience in explanation, and thus the disclosure is not limited to such singular or plural constituent elements. Even plural constituent elements may be expressed in a singular form, and even a single constituent element may be expressed in a plural form.

Although detailed embodiments of the disclosure have been described in the specification and drawings, it will be apparent that various modifications are possible within the scope of the disclosure. Accordingly, the scope of the disclosure should not be limited to the embodiments as described above, but should be defined by the appended claims below and those equivalent to the scope of the claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of performing access deregistration by a user equipment (UE), the method comprising:
   identifying whether the UE is registered on both 3rd generation partnership project (3GPP) access and non-3GPP access and the UE has no connection for the non-3GPP access;
   transmitting, to an access and mobility management function (AMF), a deregistration request message to deregister the non-3GPP access for the UE over the 3GPP access in a case that the UE is registered on both the 3GPP access and the non-3GPP access and the UE has no connection for the non-3GPP access; and
   receiving, from the AMF, a deregistration accept message corresponding to the deregistration request message over the 3GPP access.

2. The method of claim 1, wherein all protocol data unit (PDU) sessions associated with the non-3GPP access are released based on receiving the deregistration accept message.

3. The method of claim 1, wherein the identifying of whether the UE is registered on both the 3GPP access and the non-3GPP access and the UE has no connection for the non-3GPP access further comprises:
   identifying whether the UE is out of a coverage for the non-3GPP access, and
   determining that the UE has no connection for the non-3GPP access according to the identification that the UE is out of the coverage for the non-3GPP access.

4. The method of claim 1, wherein separate registration management for the 3GPP access and the non-3GPP access is provided by the AMF.

5. The method of claim 1, wherein the identifying of whether the UE is registered on both the 3GPP access and the non-3GPP access and the UE has no connection for the non-3GPP access further comprises:
   identifying whether a timer associated with the non-3GPP access has expired, and
   determining that the UE has no connection for the non-3GPP access according to the identification that the timer associated with the non-3GPP access has expired.

6. A method of performing access deregistration by an access and mobility management function (AMF), the method comprising:
   in a case that a user equipment (UE) is registered on both 3rd generation partnership project (3GPP) access and non-3GPP access and the UE has no connection for the non-3GPP access, receiving, from the UE, a deregistration request message to deregister the non-3GPP access for the UE over the 3GPP access; and
   transmitting, to the UE, a deregistration accept message corresponding to the deregistration request message over the 3GPP access.

7. The method of claim 6, wherein all protocol data unit (PDU) sessions associated with the non-3GPP access are released based on transmitting the deregistration accept message.

8. The method of claim 6, wherein the UE when the UE has no connection for the non-3GPP access in a case that the UE is out of a coverage for the non-3GPP access.

9. The method of claim 6, further comprising:
   performing separate registration management for the 3GPP access and the non-3GPP access.

10. The AMF of claim 6, wherein the controller is further configured to:
    perform separate registration management for the 3GPP access and the non-3GPP access.

11. The method of claim 6, wherein the UE has no connection for the non-3GPP access in a case that a timer associated with the non-3GPP access has expired.

12. A user equipment (UE) for performing access deregistration, the UE comprising:
    a transceiver; and
    a controller coupled with the transceiver and configured to control to:
       identify whether the UE is registered on both 3rd generation partnership project (3GPP) access and non-3GPP access and the UE has no connection for the non-3GPP access,
       transmit, to an access and mobility management function (AMF), a deregistration request message to deregister the non-3GPP access for the UE over the 3GPP access in a case that the UE is registered on both the 3GPP access and the non-3GPP access and the UE has no connection for the non-3GPP access, and
       receive, from the AMF, a deregistration accept message corresponding to the deregistration request message over the 3GPP access.

13. The UE of claim 12, wherein all protocol data unit (PDU) sessions associated with the non-3GPP access are released based on receiving the deregistration accept message.

14. The UE of claim 12, wherein the controller is further configured to:
    identify whether the UE is out of a coverage for the non-3GPP access, and
    determine that the UE has no connection for the non-3GPP access according to the identification that the UE is out of the coverage for the non-3GPP access.

15. The UE of claim 12, wherein separate registration management for the 3GPP access and the non-3GPP access is provided by the AMF.

16. The UE of claim 12, wherein the controller is further configured to:
    identify whether a timer associated with the non-3GPP access has expired, and
    determine that the UE has no connection for the non-3GPP access according to the identification that the timer associated with the non-3GPP access has expired.

17. An access and mobility management function (AMF) for performing access deregistration, the AMF comprising:
    a transceiver; and
    a controller coupled with the transceiver and configured to control to:

in a case that a user equipment (UE) is registered on both 3rd generation partnership project (3GPP) access and non-3GPP access and the UE has no connection for the non-3GPP access, receive, from the UE, a deregistration request message to deregister the non-3GPP access for the UE over the 3GPP access, and transmit, to the UE, a deregistration accept message corresponding to the deregistration request message over the 3GPP access.

18. The AMF of claim 17, wherein all protocol data unit (PDU) sessions associated with the non-3GPP access are released based on transmitting the deregistration accept message.

19. The AMF of claim 17, wherein the UE has no connection for the non-3GPP access in a case that the UE is out of a coverage for the non-3GPP access.

20. The AMF of claim 17, wherein the UE has no connection for the non-3GPP access in a case that a timer associated with the non-3GPP access has expired.

* * * * *